United States Patent
Bell et al.

(10) Patent No.: US 7,742,239 B2
(45) Date of Patent: Jun. 22, 2010

(54) METHOD TO CONTROL POINT SPREAD FUNCTION OF AN IMAGE

(75) Inventors: Gareth Paul Bell, Hamilton (NZ); Gabriel Daemon Engel, Hamilton (NZ); Mark John Searle, Cambridge (NZ); Daniel Evanicky, San Jose, CA (US)

(73) Assignee: PureDepth Limited, Auckland (NZ)

(*) Notice: Subject to any disclaimer, the term of this patent is extended or adjusted under 35 U.S.C. 154(b) by 344 days.

(21) Appl. No.: 10/508,726

(22) PCT Filed: Mar. 17, 2003

(86) PCT No.: PCT/NZ03/00046

§ 371 (c)(1), (2), (4) Date: Nov. 7, 2005

(87) PCT Pub. No.: WO03/079094

PCT Pub. Date: Sep. 25, 2003

(65) Prior Publication Data

US 2006/0103951 A1    May 18, 2006

(30) Foreign Application Priority Data

Mar. 17, 2002    (NZ) ..................................... 517457

(51) Int. Cl.
*G02B 17/00* (2006.01)
*G02B 27/00* (2006.01)

(52) U.S. Cl. .................. 359/737; 359/609; 382/254

(58) Field of Classification Search ................. 359/737, 359/599, 609
See application file for complete search history.

(56) References Cited

U.S. PATENT DOCUMENTS 2,543,793 A    3/1951    Marks
(Continued)

FOREIGN PATENT DOCUMENTS

AU    24806/00    7/2000
(Continued)

OTHER PUBLICATIONS

Office Action 10/416,885 Jun. 15, 2006.
(Continued)

*Primary Examiner*—Jordan M. Schwartz

(57) ABSTRACT

A method of controlling the point spread function of an image projected with said image being diffused by a filter; said point spread function is a result of the application of spatial filter(s) on said image; with said control of the point spread function effected by varying the distance between such image and said spatial filter(s) and varying the bidirectional scattering transmission function of the spatial filter(s). Said spatial filter may be a holographic diffuser, which by method of manufacture has a well defined bi-directional scattering transmission spread function. Control of said spread function is particularly useful to maintain image quality while abating moiré interference in situations where two periodic patterns are layered causing moiré interference.

19 Claims, 9 Drawing Sheets

U.S. PATENT DOCUMENTS

| | | |
|---|---|---|
| 2,961,486 A | 11/1960 | Marks |
| 3,536,921 A | 10/1970 | Caulfield |
| 3,605,594 A | 9/1971 | Gerritsen |
| 3,622,224 A | 11/1971 | Wysocki et al. |
| 3,863,246 A | 1/1975 | Trcka, et al. |
| 3,891,305 A | 6/1975 | Fader |
| 3,918,796 A | 11/1975 | Fergason |
| 3,940,788 A | 2/1976 | Abe et al. |
| 3,955,208 A | 5/1976 | Wick et al. |
| 3,992,082 A | 11/1976 | Katz |
| 4,153,654 A | 5/1979 | Maffitt et al. |
| 4,165,922 A | 8/1979 | Morrissy |
| 4,190,856 A | 2/1980 | Ricks |
| 4,239,349 A | 12/1980 | Scheffer |
| 4,281,341 A | 7/1981 | Byatt |
| 4,294,516 A | 10/1981 | Brooks |
| 4,333,715 A | 6/1982 | Brooks |
| 4,447,141 A | 5/1984 | Eisenkraft |
| 4,448,489 A | 5/1984 | Sato et al. |
| 4,472,737 A | 9/1984 | Iwasaki |
| 4,523,848 A | 6/1985 | Gorman et al. |
| 4,541,692 A | 9/1985 | Collins et al. |
| 4,613,896 A | 9/1986 | Takita et al. |
| 4,648,691 A | 3/1987 | Oguchi et al. |
| 4,649,425 A | 3/1987 | Pund |
| 4,670,744 A | 6/1987 | Buzak |
| 4,734,295 A | 3/1988 | Liu |
| 4,736,214 A | 4/1988 | Rogers |
| 4,768,300 A | 9/1988 | Rutili |
| 4,792,850 A | 12/1988 | Liptoh et al. |
| 5,032,007 A | 7/1991 | Silverstein et al. |
| 5,046,826 A | 9/1991 | Iwamoto et al. |
| 5,046,827 A | 9/1991 | Frost et al. |
| 5,086,354 A | 2/1992 | Bass et al. |
| 5,107,352 A | 4/1992 | Fergason |
| 5,112,121 A | 5/1992 | Chang et al. |
| 5,132,839 A | 7/1992 | Travis |
| 5,132,878 A | 7/1992 | Carey |
| 5,261,404 A * | 11/1993 | Mick et al. ............ 600/425 |
| 5,337,181 A | 8/1994 | Kelly |
| 5,367,801 A | 11/1994 | Ahn |
| 5,432,626 A | 7/1995 | Sasuga et al. |
| 5,473,344 A | 12/1995 | Bacon et al. |
| 5,537,233 A | 7/1996 | Miura et al. |
| 5,557,684 A | 9/1996 | Wang et al. |
| 5,583,674 A | 12/1996 | Mosley |
| 5,585,821 A | 12/1996 | Ishikura et al. |
| 5,589,980 A | 12/1996 | Bass et al. |
| 5,600,462 A | 2/1997 | Suzuki et al. |
| 5,689,316 A | 11/1997 | Hattori et al. |
| 5,695,346 A | 12/1997 | Sekiguchi et al. |
| 5,706,139 A * | 1/1998 | Kelly .................. 359/737 |
| 5,745,197 A | 4/1998 | Leung et al. |
| 5,751,385 A | 5/1998 | Heinze |
| 5,764,317 A | 6/1998 | Sadovnik et al. |
| 5,796,455 A | 8/1998 | Mizobata et al. |
| 5,796,509 A | 8/1998 | Doany et al. |
| 5,822,021 A | 10/1998 | Johnson et al. |
| 5,825,436 A | 10/1998 | Knight |
| 5,838,308 A | 11/1998 | Knapp et al. |
| 5,924,870 A | 7/1999 | Brosh et al. |
| 5,956,180 A | 9/1999 | Bass et al. |
| 5,976,297 A | 11/1999 | Oka et al. |
| 5,990,990 A | 11/1999 | Crabtree |
| 6,005,654 A | 12/1999 | Kipfer et al. |
| 6,018,379 A | 1/2000 | Mizobata et al. |
| 6,061,110 A | 5/2000 | Hisatake et al. |
| 6,067,137 A | 5/2000 | Ohnishi et al. |
| 6,100,862 A | 8/2000 | Sullivan |
| 6,114,814 A | 9/2000 | Shannon et al. |
| 6,122,103 A | 9/2000 | Perkins et al. |
| 6,141,067 A | 10/2000 | Ikka |
| 6,147,741 A | 11/2000 | Chen et al. |
| 6,204,902 B1 | 3/2001 | Kim et al. |
| 6,239,852 B1 | 5/2001 | Oono et al. |
| 6,287,712 B1 | 9/2001 | Bulovic et al. |
| 6,300,990 B1 | 10/2001 | Yamaguchi et al. |
| 6,326,738 B1 | 12/2001 | McAndrew |
| 6,341,439 B1 | 1/2002 | Lennerstad |
| 6,351,298 B1 | 2/2002 | Mitsui et al. |
| 6,392,725 B1 | 5/2002 | Harada et al. |
| 6,412,953 B1 | 7/2002 | Tiao et al. |
| 6,443,579 B1 | 9/2002 | Myers |
| 6,489,044 B1 | 12/2002 | Chen et al. |
| 6,504,587 B1 | 1/2003 | Morishita et al. |
| 6,512,559 B1 | 1/2003 | Hashimoto et al. |
| 6,515,881 B2 | 2/2003 | Chou et al. |
| 6,557,999 B1 | 5/2003 | Shimizu |
| 6,562,440 B1 | 5/2003 | Tsuchiya et al. |
| 6,573,961 B2 | 6/2003 | Jiang et al. |
| 6,578,985 B1 | 6/2003 | Seraphim et al. |
| 6,590,605 B1 | 7/2003 | Eichenlaub |
| 6,593,904 B1 | 7/2003 | Marz et al. |
| 6,609,799 B1 | 8/2003 | Myers |
| 6,639,349 B1 | 10/2003 | Bahadur |
| 6,679,613 B2 | 1/2004 | Mabuchi |
| 6,693,692 B1 | 2/2004 | Kaneko et al. |
| 6,771,327 B2 | 8/2004 | Sekiguchi |
| 6,812,649 B2 | 11/2004 | Kim |
| 6,845,578 B1 | 1/2005 | Lucas |
| 6,897,855 B1 | 5/2005 | Matthies et al. |
| 6,906,762 B1 | 6/2005 | Witehira et al. |
| 6,947,024 B2 | 9/2005 | Lee et al. |
| 7,072,095 B2 | 7/2006 | Liang et al. |
| 7,205,355 B2 | 4/2007 | Liang et al. |
| 7,262,752 B2 | 8/2007 | Weindorf |
| 7,352,424 B2 | 4/2008 | Searle |
| 7,372,447 B1 | 5/2008 | Jacobsen et al. |
| 2001/0040652 A1 | 11/2001 | Hayashi |
| 2002/0027608 A1 | 3/2002 | Johnson et al. |
| 2002/0047601 A1 | 4/2002 | Shannon et al. |
| 2002/0064037 A1 | 5/2002 | Lee |
| 2002/0075211 A1 | 6/2002 | Nakamura |
| 2002/0105516 A1 | 8/2002 | Tracy |
| 2002/0111195 A1 | 8/2002 | Repin et al. |
| 2002/0163728 A1 | 11/2002 | Myers |
| 2002/0163729 A1 | 11/2002 | Myers |
| 2003/0043106 A1 | 3/2003 | Woo |
| 2003/0132895 A1 | 7/2003 | Berstis |
| 2003/0184665 A1 | 10/2003 | Berstis |
| 2004/0012708 A1* | 1/2004 | Matherson ............ 348/342 |
| 2005/0146787 A1 | 7/2005 | Lukyanitsa |
| 2006/0103951 A1 | 5/2006 | Bell et al. |

FOREIGN PATENT DOCUMENTS

| | | |
|---|---|---|
| AU | 24538/00 | 8/2000 |
| AU | 68219/01 | 12/2001 |
| CA | 2009960 | 9/1990 |
| CA | 2104294 | 8/1992 |
| CN | 1356584 | 7/2002 |
| CN | 1369997 | 9/2002 |
| DE | 2730785 | 1/1979 |
| DE | 19757378 | 7/1998 |
| DE | 29912074 | 11/1999 |
| DE | 19920789 | 5/2000 |
| DE | 19916747 | 10/2000 |
| EP | 76651 | 4/1983 |
| EP | 0 195 584 | 9/1986 |
| EP | 0 336 351 | 10/1989 |
| EP | 0389123 | 9/1990 |
| EP | 454423 | 10/1991 |
| EP | 0573433 | 12/1993 |
| EP | 595387 | 5/1994 |

| | | |
|---|---|---|
| EP | 0802684 | 10/1997 |
| EP | 0999088 | 5/2000 |
| EP | 1151430 | 8/2000 |
| EP | 1155351 | 8/2000 |
| EP | 1046944 | 10/2000 |
| EP | 1081774 | 3/2001 |
| EP | 1093008 | 4/2001 |
| EP | 2000/0733927 | 7/2001 |
| EP | 1231757 | 8/2002 |
| EP | 1287401 | 3/2003 |
| EP | 1923860 | 5/2008 |
| GB | 1 448 520 | 9/1976 |
| GB | 2107482 | 4/1983 |
| GB | 2312584 | 10/1997 |
| GB | 2314943 | 1/1998 |
| GB | 2347003 | 8/2000 |
| GB | 2372618 | 8/2002 |
| JP | 56-007916 | 1/1981 |
| JP | 60024502 | 2/1985 |
| JP | 60-103895 | 6/1985 |
| JP | 60-122920 | 7/1985 |
| JP | 60-233684 | 11/1985 |
| JP | 60-244924 | 12/1985 |
| JP | 61-166524 | 7/1986 |
| JP | 61-200783 | 9/1986 |
| JP | 63-067094 | 3/1987 |
| JP | 62-122494 | 6/1987 |
| JP | 62-161294 | 7/1987 |
| JP | 62-191819 | 8/1987 |
| JP | 62-191820 | 8/1987 |
| JP | 62-235929 | 10/1987 |
| JP | 63-100898 | 5/1988 |
| JP | 63-203088 | 8/1988 |
| JP | 63-274918 | 8/1988 |
| JP | 63-318856 | 12/1988 |
| JP | 2-262119 | 10/1990 |
| JP | 03-002835 | 1/1991 |
| JP | 3021902 | 1/1991 |
| JP | 3-101581 | 4/1991 |
| JP | 3174580 | 7/1991 |
| JP | 3-233548 | 10/1991 |
| JP | 3226095 | 10/1991 |
| JP | 4-034521 | 2/1992 |
| JP | 4-034595 | 2/1992 |
| JP | 04-107540 | 4/1992 |
| JP | 4191755 | 7/1992 |
| JP | 5-007373 | 1/1993 |
| JP | 5-091545 | 4/1993 |
| JP | 5-142515 | 6/1993 |
| JP | 6-233328 | 8/1994 |
| JP | 63-039299 | 11/1994 |
| JP | 8-076139 | 3/1995 |
| JP | 7146473 | 6/1995 |
| JP | 07-198921 | 8/1995 |
| JP | 07-198942 | 8/1995 |
| JP | 7-209573 | 8/1995 |
| JP | 7-222202 | 8/1995 |
| JP | 8-036375 | 2/1996 |
| JP | 08-335043 | 12/1996 |
| JP | 09-033858 | 2/1997 |
| JP | 9-043540 | 2/1997 |
| JP | 9-096789 | 4/1997 |
| JP | 9-102969 | 4/1997 |
| JP | 9-133893 | 5/1997 |
| JP | 09211392 | 8/1997 |
| JP | 9-282357 | 10/1997 |
| JP | 9-308769 | 12/1997 |
| JP | 10-003355 | 1/1998 |
| JP | 10-039821 | 2/1998 |
| JP | 10-105829 | 4/1998 |
| JP | 10-228347 | 8/1998 |
| JP | 10232304 | 9/1998 |
| JP | 10-312033 | 11/1998 |
| JP | 11-066306 | 3/1999 |
| JP | 11-205822 | 7/1999 |
| JP | 2000-075135 | 3/2000 |
| JP | 2000-111940 | 4/2000 |
| JP | 2000-113988 | 4/2000 |
| JP | 2000-142173 | 5/2000 |
| JP | 2001-56410 | 2/2001 |
| JP | 2001-215332 | 4/2002 |
| JP | 2002-097269 | 4/2002 |
| JP | 2002-156608 | 5/2002 |
| JP | 2002-258284 | 9/2002 |
| JP | 2002-287144 | 10/2002 |
| JP | 2002-350772 | 12/2002 |
| JP | 2003-015555 | 1/2003 |
| JP | 2002-099223 | 10/2003 |
| NO | 20005178 | 4/2001 |
| PL | 343229 | 4/2001 |
| WO | 91/12554 | 8/1991 |
| WO | 91/15930 | 10/1991 |
| WO | 92/09003 | 5/1992 |
| WO | 92/15170 | 9/1992 |
| WO | 9627992 | 9/1996 |
| WO | 98/04087 | 1/1998 |
| WO | 98/16869 | 4/1998 |
| WO | 98/47106 | 10/1998 |
| WO | 99/42889 | 8/1999 |
| WO | 99/44095 | 9/1999 |
| WO | WO 00/17708 | 3/2000 |
| WO | 00/36578 | 6/2000 |
| WO | 00/48167 | 8/2000 |
| WO | 00/49453 | 8/2000 |
| WO | 01/15128 | 3/2001 |
| WO | 01/95019 | 12/2001 |
| WO | 02/35277 | 5/2002 |
| WO | 02/091033 | 11/2002 |
| WO | 03/003109 | 1/2003 |
| ZA | 9703025 | 11/1997 |

OTHER PUBLICATIONS

Office Action 10/416,885 Nov. 2, 2005.
Office Action 10/475,432 Feb. 1, 2006.
Office Action 10/475,432 Feb. 26, 2007.
Office Action 10/475,432 Jul. 28, 2006.
Office Action 10/475,432 Sep. 27, 2005.
Office Action 10/475,432 Oct. 5, 2007.
Office Action 10/475,432 Dec. 20, 2007.
Office Action 10/492,624 Aug. 1, 2007.
Office Action 11/402,847 Jan. 14, 2008.
Office Action 11/402,847 Jun. 4, 2007.
Office Action 11/402,847 Sep. 12, 2007.
Office Action 11/402,847 Nov. 16, 2006.
"Kodak Datashow HR/M Projection Pad", Motion Picture & Audiovisual Products, Eastman Kodak Co., 1988.
Alampiev et al., "Technology of the Three Dimensional Electronic Matrix for Liquid Crystal Display" Jan. 1, 1976.
General Electric, "3-D Liquid Crystal Display for Mine Detecting Radar" Apr. 1, 1974.
Hattori, T. et al,; "Spatial Modulation Display Using Spatial Light Modulators", Optical Engineering, vol. 31, No. 2, pp. 350-352, (Feb. 1992).
L.F. Hodges et al., True Three-Dimensional CRT-Based Displays, Infor. Display, pp. 18-22 (May 1987).
Tamura et al., "Multilayer 3-D Display Adapter", Applied Optics, vol. 17, No. 23, pp. 3695-3696 (Dec. 1, 1978).
Technical Report of the Institute of Television Engineers of Japan, vol. 20, No. 5, Feb. 1996.
Tomohiko Hattori et al: "Spatial Light Modulators" Optical Engineering, vol. 31, No. 2, Feb. 1, 1992, pp. 350-352.
Office Action 10/475,432; Mail Date Aug. 28, 2008.
Office Action 10/492,624; Mail Date Jan. 5, 2009.
Office Action 10/492,624; Mail Date Aug. 1, 2007.
Office Action 10/528,334; Mail Date Feb. 24, 2009.

Office Action 10/528,334; Mail Date Aug. 5, 2008.
Non Final OA Dated Jan. 5, 2009; U.S. Appl. No. 10/492,624.
Final OA Dated Feb. 24, 2009; U.S. Appl. No. 10/528,334.
Non Final OA Dated Apr. 29, 2009; U.S. Appl. No. 10/521,413.
Non Final OA Dated Apr. 14, 2009; U.S. Appl. No. 10/475,432.
Non-Final Office Action Dated Jun. 22, 2009; U.S. Appl. No. 10/492,624.
Non-Final Office Action Dated Sep. 1, 2009; U.S. Appl. No. 10/528,334.
"Teamworkstation 1989-1994," http://web.media.mit.edu/~ishii/TWS.html, pp. 1-4, 1994.
"Textarc: An Alternate Way to View a Text," http://textarc.org, p. 1, 2002.
"Textarc: NYSCA Grant and Public Installation," http//textarc.org, p. 1, 2002.
"Textarc: The Print and the Artist," http://textarc.org, p. 1, 2002.
Blundell et al., "Volumetric Three-Deminsional Display Systems", pp. 1-7, 2000.
Buzak, "CRT Displays Full-color 3-D Images", pp. 1-2, 1985.
Clearboard 1991-1994, http://web.media.mit.edu/~ishii/CB.html, pp. 1-3, 1994.
Cole et al., "A Three-Dimensional Display for Radar Returns", pp. 52-53, 1974.
Courter et al., Microsoft Office 2000 Professional Edition, Sybex Inc., pp. xxxi, 543, 685, 1999.
Harrison et al., "Transparent Layered User Interfaces: An Evaluation of a Display Design to Enhance Focused and Divided Attention" ACM, pp. 1-13, 1995.
Ishii et al., "Iterative Design of Seamless Collaboration Media", Communications of the ACM, vol. 37, pp. 83-97, 1994.
Final Office Action Dated Oct. 19, 2009; U.S. Appl. No. 10/521,413.
Non-Final Office Action Dated Dec. 28, 2009; U.S. Appl. No. 12/046,265.
Final Office Action; Mail Date Feb. 5, 2010; U.S. Appl. No. 10/492,624.

* cited by examiner

METHOD TO CONTROL POINT SPREAD FUNCTION OF AN IMAGE

TECHNICAL FIELD

This invention relates to the field of improved imaging technology. In particular, this invention will be discussed in relation to display technology with multiple image layers.

Reference shall now be made to use of the present invention in relation to multiple layered display technology.

BACKGROUND ART

There are two main types of displays used in computer monitors, passive matrix and active matrix. Passive-matrix displays use a simple grid to supply the charge to a particular pixel on the display. Creating the grid starts with two glass layers called substrates. One substrate is given columns and the other is given rows made from a transparent conductive material. This is usually indium tin oxide. The rows or columns are connected to integrated circuits that control when a charge is sent down a particular column or row. The electro-optical material is often sandwiched between the two glass substrates.

A pixel is defined as the smallest resolvable area of an image, either on a screen or stored in memory. Each pixel in a monochrome image has its own brightness, from 0 for black to the maximum value (e.g. 255 for an eight-bit pixel) for white. In a colour image, each pixel has its own brightness and colour, usually represented as a triple of red, green and blue intensities. To turn on a pixel, the integrated circuit sends a charge down the correct column of one substrate and a ground activated on the correct row of the other. The row and column intersect at the designated pixel and that delivers the voltage to untwist the liquid crystals at that pixel.

The passive matrix system has significant drawbacks, notably slow response time and imprecise voltage control. Response time refers to the display's ability to refresh the image displayed. Imprecise voltage control hinders the passive matrix's ability to influence only one pixel at a time.

When voltage is applied to change the optical state of one pixel, the pixels around it also partially change, which makes images appear un-sharp and lacking in contrast.

Active-matrix displays depend on thin film transistors (TFH). Thin film transistors are tiny switching transistors and capacitors. They are arranged in a matrix on a glass substrate. To address a particular pixel, the proper row is switched on, and then a charge is sent down the correct column. Since all of the other rows that the column intersects are turned off, only the capacitor at the designated pixel receives a charge. The capacitor is able to hold the charge until the next refresh cycle; and if the amount of voltage supplied to the crystal is carefully controlled, it can be made to untwist only enough to allow some light through. By doing this in very exact, very small increments, displays can create a grey scale. Most displays today offer 256 levels of brightness per pixel.

Displays that can show colours may have three sub-pixels with red, green and blue colour filters to create each colour pixel. Through the careful control and variation of the voltage applied, the intensity of each sub-pixel can range over 256 shades. Combining the sub-pixels produces a possible palette of 16.8 million colours (256 shades of red×256 shades of green×256 shades of blue). These filters are arranged such that they form vertical red, green and blue stripes across the panel.

The frequency spectrum of radiation incident upon a detector depends on the properties of the light source, the transmission medium and possibly the properties of the reflecting medium. If one considers the eye as a detector the human visual system can sense radiation that has a wavelength between 0.6 nm and 380 nm. Hence this is described as the visual part of the electromagnetic spectrum. Humans perceive certain frequency distributions as having different colours and brightness. A scheme was devised to describe any perceived colour and brightness via adding three basis spectral distributions with various weights. For example in the 1931 CIE colour space any perceivable colour may be described by the following equation:

$$C = x_r X + y_r Y + z_r Z$$

Where C is the colour being described, Xr, Yr and Zr are the weights and X, Y and Z are 1931 CIE tristimulis curves which are graphs of the relative sensitivity of the eye Vs wavelength. For any given colour, the weights may be determined by the following equations:

$$x_r = \left( \int C(\lambda) X(\lambda) d\lambda \right)$$
$$y_r = \left( \int C(\lambda) Y(\lambda) d\lambda \right)$$
$$z_r = \left( \int C(\lambda) Z(\lambda) d\lambda \right)$$

The 1931 co-ordinates are formed via the following normalisation:

$$x_r = \frac{X_r}{X_r + Y_r + Z_r}$$
$$y_r = \frac{Y_r}{X_r + Y_r + Z_r}$$
$$z_r = 1 - x_r - y_r$$

These may be plotted on the 1931 CIE diagram. The spectral locus defines the pure spectral colours, that is the perception of radiation with a specific wavelength. Colour co-ordinates that are closer or farther from pure spectral colours are described as being more or less saturated respectively. The value of the y coordinate multiplied by 683 is also referred to as the luminance denoted by the symbol L.

The perception model described above accurately predicts that colours on addressable objects can be formed by mixing small areas of three basis colours with modulated intensities which are close in either close spatial or temporal proximity. If the basis colours are plotted on the CIE diagram then the enclosed triangle contains all the colours producible by the system. The enclosed area is called the colour gamut and hence a addressable object with a larger area can addressable object a greater variation in colour and has a greater colour gamut.

Displays employ several variations of liquid crystal technology, including super twisted nematics, dual scan twisted nematics, ferroelectric liquid crystal and surface stabilized ferroelectric liquid crystal. They can be lit using ambient light in which case they are termed as reflective, or backlit and termed transmissive. There are also emissive technologies and reflective technologies such as Organic Light Emitting Diodes and electronic ink which are addressed in the same manner as Liquid Crystal displays.

At present there exist displays that by various means enable the stacking of addressable object planes at set distances. As well as the binocular depth cue, they feature intrinsic motion parallax, where the x and y distance changes between objects displayed on different planes depending on viewing angle. Additionally separate focal planes may be literally be brought in and out of focus depending on the focal length of the lens in the viewers eye. These displays consist of a high-brightened backlight, a rear image panel which is usually an active matrix, colour liquid crystal display, a diffuser, a refractor and a front image plane which are laminated to form a stack. There are generally colour filter stripes as mentioned above, and a black matrix on each display which defines the borders of the pixels. However it should be appreciated that the following discussion applies to all addressable object planes that are addressed by passive or active matrices or have colour filters arranged in any periodic pattern, or any optically active periodic pattern. The displays are close to each other, as far as the viewer is concerned they form two similar, but not identical periodic patterns on the retina. This is because the solid angle subtended by the repeating patterns is different, which causes the colour stripes and black matrix boundaries to have slightly different pitches when projected onto the retina.

These conditions are sufficient to cause a phenomenon called moiré interference, which is characterized by large, annoying vertical red, green and blue stripes. The diffuser combats the interference by spreading the intensity distribution of the image formed by the colour filters. However while this may help remove moiré it has the effect of changing the bidirectional scattering transmission function of the sub-pixels, smearing them to a point spread function thus effectively reducing the resolution of the display. Therefore to make a good display or optical system where the image remains sharp and the amplitude of the moiré interference is hardly noticeable, these two conflicting factors must be carefully controlled.

Typically the diffuser is of the form of a chemically etched series of surface features on a thin (0.000115 meter), birefingent substrate such polyester. If the pattern was viewed under a microscope at 1000× magnification it would be undulating in topology. Because of the polarised nature of the displays this can cause the total luminance, which is evaluated at the front display by the viewer, to be reduced because it changes the degree and polarization orientation from the optimum. A similar pattern is available on a non-birefringent surface such as acrylic but this substrate cannot be made thin enough as not over-blur the rear most pixels. In general one cannot easily control the angular distribution of the light as it exits a typical diffuser. Also because there is an extra layer in the optical stack, extra air-plastic or air-glass interfaces are formed causing back reflections. These decrease the brightness of the display because at least 4% of the light is directed towards the backlight, as opposed, to the viewing direction. The ratio of the reflected and transmitted radiation is given by Fresnel's equations which are well known in the art. Note that if a ray is at some angle from the normal significantly more than 4% of light may be reflected. This reflected light may also be re-reflected out to the viewer, but may not appear to come from the correct origin, reducing the contrast of the display. Also because the film is on a separate sheet it has the tendency to deform due to the heat from the high-brightness backlight which is visible to the viewer and can exasperate the sharpness problem described above. Point spread functions for typical, commercially available diffusers are circularly symmetric, that is their gain is constant for a given radius.

A holographic diffuser is a transparent or translucent structure having an entrance surface, an exit surface, and light shaping structures formed on its entrance surface and/or in its interior. These light shaping structures are random, disordered, and non-planar micro sculpted structures.

These structures are created during recording of the medium by illuminating the medium with a speckle pattern produced in conjunction with coherent light or the combination of incoherent light and a computer-generated mask which simulates speckle. The speckle produced changes in the refractive index of the medium which, when developed, are the micro-sculpted structures. These light shaping structures diffract light passing through the holographic diffuser so that the beam of light emitted from the holographic diffuser's exit surface exhibits a precisely controlled energy distribution along horizontal and vertical axes. Holographic diffusers can be used to shape a light beam so that over 90% (and up to 95%-98%) of the light beam entering the holographic diffuser is directed towards and into contact with a target located downstream of the holographic diffuser. A holographic diffuser can be made to collect incoming light and either (1) distribute it over a circular area from a fraction of a degree to over 100 degrees, or (2) send it into an almost unlimited range of elliptical angles. For example, a 2 degree×50 degree. holographic diffuser will produce a line when illuminated by a LED or laser and a 35 degree×0.90 degree. Thus a holographic diffuser is not a typical example of a diffuser, since it may send most of the incoming light out at elliptical angles and these particular angles may be finely controlled.

The following discussion describes pixel patterns used in the imaging industry. For the purposes of illustration it is assumed a sub-pixel is a 0.1 mm×0.3 mm rectangle, with the long axis of the rectangle in the y direction and a pixel is a 0.3 mm×0.3 mm square, however it should be appreciated that a pixel can be any shape that is possible to tessellate and a sub pixel can be any one of a set of shapes which are possible to tessellate in combination. To define this rigorously consider a set of regular points in 2D space forming a lattice and the same collection of pixels or sub-pixels at these points. Then the pixel pattern is wholly described by the lattice and the collection of sub-pixels or pixels at that point which are called a basis. The lattice can in turn be described by a primitive lattice cell comprised of two linearly independent vectors which form two sides of a parallelogram.

The following radio metric quantities will be used throughout this specification are defined below:

Luminous Flux is the flow rate of visual energy and is measured in lumens.

Illuminance is a measure of photometric flux per unit area, or visible flux density. Illuminance is measured in lux (lumens per square meter).

Luminance is the illuminance per solid angle.

To appreciate the solid angle concept consider a spherical surface of radius r containing an area element $\Delta A$. The solid angle at the centre of the sphere is defined to be $$\Delta \Omega = \frac{\Delta A}{r^2}.$$

Pixels on a transmissive addressable object will be capable of maximum and minimum luminous states. Labelling the maximum state as $L_b$ and the minimum as $L_d$ then the contrast ratio is described by $$C_r = \frac{L_b}{L_d}$$

The term contrast ratio is usually abbreviated to just contrast.

From http://www.cquest.utoronto.ca/psych/psy280f/ch5/csf.html "The contrast sensitivity function (CSF) plots the contrast sensitivity for the human visual system (1/(contrast threshold)) for all spatial frequencies. Viewers are most sensitive to intermediate frequencies (~4-8 cycles per degree). Viewers are less sensitive to lower frequencies, and less sensitive to higher frequencies.

The CSF shows us the observer's window of visibility. Points below the CSF are visible to the observer (those are the points that have even higher contrasts than the threshold level). Points above the CSF are invisible to the observer (those are the points that have lower contrasts than the threshold level). The lowest visible frequency (at 100% contrast) is the low frequency cut-off, and the highest visible frequency (at 100% contrast) is the high frequency cut-off."

DISCLOSURE OF INVENTION

According to one aspect of the present invention there is a method of controlling the point spread function;

The term 'point spread function' is defined as the output of the imaging system for an input point source, in particular it describes the distribution of a single object point after passing through a filter with a particular spatial frequency response;

in an optical system consisting of an object, at least one spatial filter, and the image projected by that object with said spatial filter(s) located between said object and said image where said point spread function is a representation of the application of spatial filter(s) on said image;

with said point spread function controlled by varying the distance between said image and said spatial filter(s) and bidirectional scattering transmission function of the spatial filter(s).

The spatial filter is characterised by the bidirectional scattering transmission distribution function, which describes how a small cone of light rays around a single point is transmitted through a surface. Said function is defined as $$f_s(\omega_i \to \omega_o) = \frac{dL_o(\omega_o)}{L(\omega_i)d\sigma^\perp(\omega_i)}$$

where the left hand side of the equation is the observed radiance in the direction of $\omega_o$, per unit of irradiance arriving from $\omega_i$. The arrow on the left hand side of the equation symbolises the direction of the light flow. The equation on right hand side is the ratio of the luminance out to the illuminance in, contained in a small solid angle around a $\omega_i$.

The, or each, spatial filter may be any type of spatial filter used in known optical technology such as, for example, a holographic diffuser, prismatic filter, a hologram, or any filter that changes the direction of light in a defined way. Reference throughout this specification to a spatial diffuser is purely exemplary and should not be viewed as limiting in any way.

Said point spread function can be determined by the following equation $$PSF(x_D, y_D, Z_{OD}, Z_{LD}) = \quad (1)$$

$$\frac{f_s(\varpi_i \to \varpi_o)L_O(\theta_H, \theta_V)A_{pupil}^2}{\left(\frac{(x_D - x_O)^2}{M^2} + \frac{(y_D - x_O)^2}{M^2} + Z_{OD}^2\right)\left(\frac{x_R^2}{M^2} + \frac{y_R^2}{M^2} + Z_{DL}^2\right)} M^2$$

where $$\theta_H = \tan^{-1}\left(\frac{x_R}{MZ_{OD}}\right)$$

$$\theta_V = \tan^{-1}\left(\frac{y_R}{MZ_{OD}}\right)$$

Table 1 introduces all of the relevant notation, note that one example of a projective system is the object, the cornea/lens and the retina system but the discussion pertains to any system containing an object, a lens an image:

| | |
|---|---|
| x, y, z | x, y, z coordinates |
| $Z_{OD}$ | Distance along z axis between object and diffuser |
| $Z_{DL}$ | Distance along z axis between diffuser and lens |
| $Z_{LR}$ | Distance along z axis between lens and retina |
| $\Omega_{OD}$ | Solid angle formed between point source and $\delta A_D$ |
| $\Omega_{DL}$ | Solid angle formed between the intersection of the ray we are following and the diffuser plane |
| M | Magnification of the lens system |
| \| \| | Modulus of a vector |
| \|\| \|\| | Norm of a vector |
| $\to$ | Direction of optic flow |
| $\omega_i$ | $\|R *_{OD}\|$ |
| $\omega_o$ | $\|R *_{DL}\|$ |

This analysis enables one to take a spatial filter of a particular type, spaced at a particular distance from the display and to derive a linear transform to be used on a representation of the image. So the presence of the physical apparatus is not required to evaluate the correct BTDF, or portion thereof, and distance to provide the optimum image quality, saving development time and cost.

Images that are portrayed and viewed using typical display technology are discreet approximations of the real world and are said to be pixelised. The diffusion of said pixelisation, so that the sharp boundaries between pixels are no longer perceptible, is one method to make the object appear more natural. Prior art diffusion and de-pixelisation methods are subject to trial and error. Upon the application of a diffuser, or other spatial filter to an image the luminance as measured substantially in the direction perpendicular to the surface of the image layer, the viewer looking substantially in this direction when viewing or using the display, will be reduced and consequently the contrast will be reduced. Additionally if there are any interstitial elements between the image layer and the diffuser then it may not be possible to get the diffuser close enough to the image layer so as not to over blur the image. Prior art provides no way to finely control said depixelisation nor is there a way to predict for a given spatial filter at a given distance what the effect on the image will be in terms of contrast, luminance, point spread and most importantly the viewers perception of the image. The current invention describes a way to pre-determine, control and most importantly optimize the de-pixelisation process.

The preferred point spread function should remove frequencies higher than the sub-pixel frequency, but none below. The ideal filter would be a perfect cut-off filter at the sub-pixel frequency. However given a range of physically realisable filters with known BTDF's a difference metric, such as differences between the square root integral, weighted by the contrast sensitivity function of the human visual system, can be used to determine the departure from the ideal, which can be minimised, so as to pick the best physical embodiment.

According to another aspect of this invention it is desirable to maintain as far as practical the contrast and luminance characteristics of the original object. Also it is preferable, because of the presence of interstitial optical films of significant thickness, to be able to have the spatial filter as far from the image as possible. This is achieved when the bi-directional transmission distribution function is narrow for all input angles.

According to another aspect of the present invention point spread function can be pre-determined and the trade off between moiré interference and image clarity abated;

in an optical system consisting of at least two addressable object planes with periodicity and at least one spatial filter between at least two of the addressable object planes where said point spread function is a result of the application of spatial filter(s) on said image, with said point spread function being controlled by varying the distance between an object and said spatial filter(s) and varying bidirectional scattering transmission function characteristic of the spatial filter(s).

In typical multilayered technologies moiré interference is caused due to the periodicity of the layers. Diffusion techniques can be employed to abate moiré interference. However methods employed in prior art are subject to trial and error and result in residual moiré interference and an unnecessarily large drop in the perceived quality of the image.

The moiré interference as it appears on the image plane can be characterised by the following equation which describes the luminous intensity of the final image evaluated at the retina or any other image plane $$E(x,y) = \sum_{\substack{i=1...m \\ j=1...n}}^{m,n} BL_0 \cdot \left( PSF(x,y) * \begin{bmatrix} R(x,y)_R T(\lambda)_{Red,R} \\ R(x,y)_G T(\lambda)_{G,R} \\ R(x,y)_B T(\lambda)_{B,R} \end{bmatrix} \right) [F(x,y)_R T(\lambda)_{Red,F}$$

$$\frac{F(x,y)_G T(\lambda)_{G,F} F(x,y)_B T(\lambda)_{B,F}] M^2 A_{lens} \cos^4(\theta)}{z'^2} \quad (2)$$

Where $BL_0$ is the radiance of the backlight, $PSF(x,y)$ is the point spread function described earlier, $T_{Red}$, $T_G$ and $T_B$ are the spectral transmission functions of the dye layers where second subscripts R and F designate the front and rear imaging layers respectively, M is the magnification of the thin lens system given by $z'/z_o$ and $A_{lens}$ is the area of the lens in the system.

Once the intensity distribution on the back of the retina is known the distortion to the subjective image quality is described by the following metric $$D_1 = \frac{1}{\ln(2)} \int_{v_o}^{v_{max}} \sqrt{\frac{M_{D_o}(v)}{M_t(v)}} \, d(\ln(v)) - \frac{1}{\ln(2)} \int_{v_o}^{v_{max}} \sqrt{\frac{M_D(v)}{M_t(v)}} \, d(\ln(v)) \quad (3)$$

$$D_2 = \frac{1}{\ln(2)} \int_{v_o}^{v_{max}} \sqrt{\frac{M_{M_o}(v)}{M_t(v)}} \, d(\ln(v)) - \frac{1}{\ln(2)} \int_{v_o}^{v_{max}} \sqrt{\frac{M_M(v)}{M_t(v)}} \, d(\ln(v))$$

$$D = D_1 + D_2$$

where $$M(v) = \left| \frac{F_{X'}(v)/F_X(0)}{F_X(v)/F_X(0)} \right|$$

is defined as the modulation transfer function where $F_{X'}(v)$ and $F_X(v)$ are representations of the distorted and undistorted images in the frequency domain respectively and $F_X(0)=F_{X'}(0)$ are the average luminance's of the distorted and undistorted images $$M_t = \frac{1}{CSF(\omega(v))}$$

where $CSF(\omega)$ is the contrast sensitivity function $M_D(v)$ is the filtered image and $M_{D_0}(v)$ is the unfiltered image that is being compared $M_M(v)$ is the image with moiré and $M_{M_0}(v)$ is the ideal image without moiré.

Preferably, there is little perceptible moiré interference present and the object maintains its original image quality, and as such the BDTF of the spatial filter and the distance of said spatial filter from the display is picked such that the value of D, in equation (3) above is at a minimum for any given set of pixel patterns.

The advantages will become clear when the modern product development process is considered. Nowadays the this could be broken down into the following five phases
  i. Specification
  ii. Soft prototyping
  iii. Hard prototyping
  iv. Validation
  v. Manufacturing Within the development process, steps (ii) to (iv) are repeated many times, to get the product to the point where the it is suitable for manufacture. Step (ii) in the modern process requires the use of computer aided design tools which significantly reduce the number of iterations at step (iii). There exist no specialised tools in the prior art for the purposes of multilayered optics, typically those available use Monte Carlo ray tracing techniques which involve large numbers of calculations.

According to another embodiment of this invention the results contained within equations (1), (2) or (3) are incorporated into an algorithm where
  (i) The distance between the spatial filter and the object
  (ii) The pixel structure for the object layers
  (iii) The available spatial filters (iv) The refractive indices within the optical stack are entered and the algorithm provides (a) a subjective image quality value for each combination of the above parameters (b) the best configuration of the distance between layers and the spatial filter.

The algorithm provides a procedure to preserve the image quality by the and abate more interference by the manipulation and optimization of the point spread function acting on the image caused by the spatial filter, and additionally provides a simple, timely means to do this in absence of a group of observers and at the soft prototype stage.

To further appreciate the advantages of a soft prototyping system, in terms of cost and time, over a trial and error approach consider the following example: In multi-layered displays the gap between the diffuser and object layer is controlled by "adjusting" the thickness of a birefringence free substrate such as glass or acrylic. In reality this adjustment is not trivial. Because layers in the stack are viewed through polarizers, any stress on or within these layers causes birefringence which appears as coloured or dark patches within the display. So cast acrylic is generally used, as extruding the material induces stress, introducing unwanted birefringence into the multi-layered display stack. On the other hand if the casting method of forming the acrylic is used, there is no birefringence present however the thickness across the sheet can vary by millimetres resulting in variable image quality. There exist proprietary methods to overcome this dilemma, however there is no "real time" adjustment possible. In order to change the thickness of the substrate die and machine set-ups need to be altered resulting in considerable delays and expense.

Additionally there is the problem that one needs to have a physical object, that is one cannot determine the correct thickness of acrylic to be used by specification of the object alone. If the object is a flat panel display then it is necessary that the display be first constructed, which can take between 6 and 12 months and incur large costs, typically in the order of millions of $USD. This implies that there is no way of determining the optimum object specification, so a display that is optimised for the purposes of layering can be specified correctly first time.

According to yet another aspect of the present invention an image will have a periodic pattern which is asymmetric. Pixel patterns which are commonly employed in display technologies are asymmetric. For example the red, green, blue stripe pattern commonly found in liquid crystal displays and other display technologies are asymmetric in their arrangement.

Commonly available filters are circularly symmetric. The result of applying a circularly symmetric filter on an asymmetric pixel image pattern is a circularly symmetric point spread function—resulting in over-blurring of the initial image and over degradation of the image quality.

In another embodiment of the invention control spread function caused by a spatial diffuser acting upon an image with an asymmetric pattern can be soft and hard prototyped by varying the distance between such image and said spatial filter(s) and by varying bidirectional scattering transmission function of the spatial filter(s). Preferably the spatial diffuser employed is of known characteristics such that its bidirectional scattering transmission function is asymmetric.

Preferably the spatial diffuser used in the present invention will be a holographic diffuser.

According to yet another aspect of the present invention point spread function can be soft and hard prototyped and moiré interference abated;

in an optical system consisting of a at least two addressable object planes with periodicity and at least one spatial filter between at least two of the addressable object planes where said point spread function is a result of the application of spatial filter(s) on said image, with said point spread function being controlled by varying the distance between such image and said spatial filter(s) and independently varying the BTDF characteristic of the spatial filter(s) along any axis in the x-y plane.

In typical display technologies there is a black matrix defining the borders of the sub-pixels on an object layer in order to hide any manufacturing defects. Two, or more, of these layers combined when imaged on the retina produce a pattern composed of lines of greater and lesser spatial density. This pattern is perceived as bright and dark stripes. The black matrix is approximately an order of magnitude smaller than the size of the sub-pixel and requires only a small amount of spreading in the x and y directions.

On the other hand in a stripe pattern for example the coloured sub-pixels on the requires spreading across their nearest neighbours in the x direction.

So the stripe pixel pattern is a superposition of this situation and ideally is spread exactly over the width of two sub-pixels in the x direction and exactly the width of the black matrix in the y direction.

According to one aspect of the present invention coloured and black moiré is overcome by control of an asymmetric point spread function.

According to yet another aspect of the present invention point spread function can be soft and hard prototyped and moiré interference abated; whilst maintaining image quality.

Generally, a given point within a region on an image plane surrounded by a group of regions with substantially the same optical emission spectrums or absorption profiles, then is preferable, to control the point spread function the extent practical, to spread the point no further than half the distance to the nearest point on the border of the boundary of the nearest neighbouring region to avoid moiré interference with another image layer and maintain the image quality on the image plane. The half factor is incorporated because the nearest neighbouring region is spread also.

Preferably the spatial filter is a holographic diffuser, with full width half maximum less than 30 degrees on either the x or the y axis.

Whilst the holographic diffusion pattern may be recorded using a laser and mask arrangement it can be reproduced, and indeed any diffusion pattern may be produced to within a given tolerance by many different methods. One such method is calenderending where an adhesive, usually epoxy that is curable by ultra-violet radiation, is applied to the desired surface and a 3D negative impression of the surface, on a transparent substrate, to be reproduced is pushed into the adhesive. The adhesive is then cured by applying the UV radiation through the substrate, and the substrate removed leaving a surface impression. Also the pattern may be applied to the surface during its manufacturing process, such as embossing the pattern onto a plastic sheet whilst the surface is still soft. It also may be applied using material removal systems such as acid or abrasion. Thus a pattern may be applied to any surface within the optical stack.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

At present there exist methods to produce displays where several imaging planes are stacked with set distances between them. These imaging planes may also be stacked as closely as possible. These displays consist of a high-brightened backlight, a rear image panel which is usually an active matrix, colour display, a diffuser and a front image plane, which are laminated to form a stack. There are generally colour filter stripes, and a black matrix on each display which defines the borders of the pixels. However it should be appreciated that the following discussion applies to all addressable object planes that are addressed by passive or active matrices or have colour filters, or any periodic pattern. For the purposes of the present invention these addressable object planes may not be addressable at all.

It is an object of the present invention to address the foregoing problems or at least to provide the public with a useful choice.

Further aspects and advantages of the present invention will become apparent from the ensuing description which is given by way of example only.

Reference throughout this specification will now be made to the present invention as applying to video display systems. However, it should be appreciated by those skilled in the art that other types of display and imaging systems may be used in conjunction with the invention, not necessarily being video screens.

According to one embodiment of the present invention there is provided a mathematical model for predicting and optimising the trade-off between moiré interference and image quality by use of a spatial filter within a multi-layered image system where said layers contain periodic elements.

Figure 1:
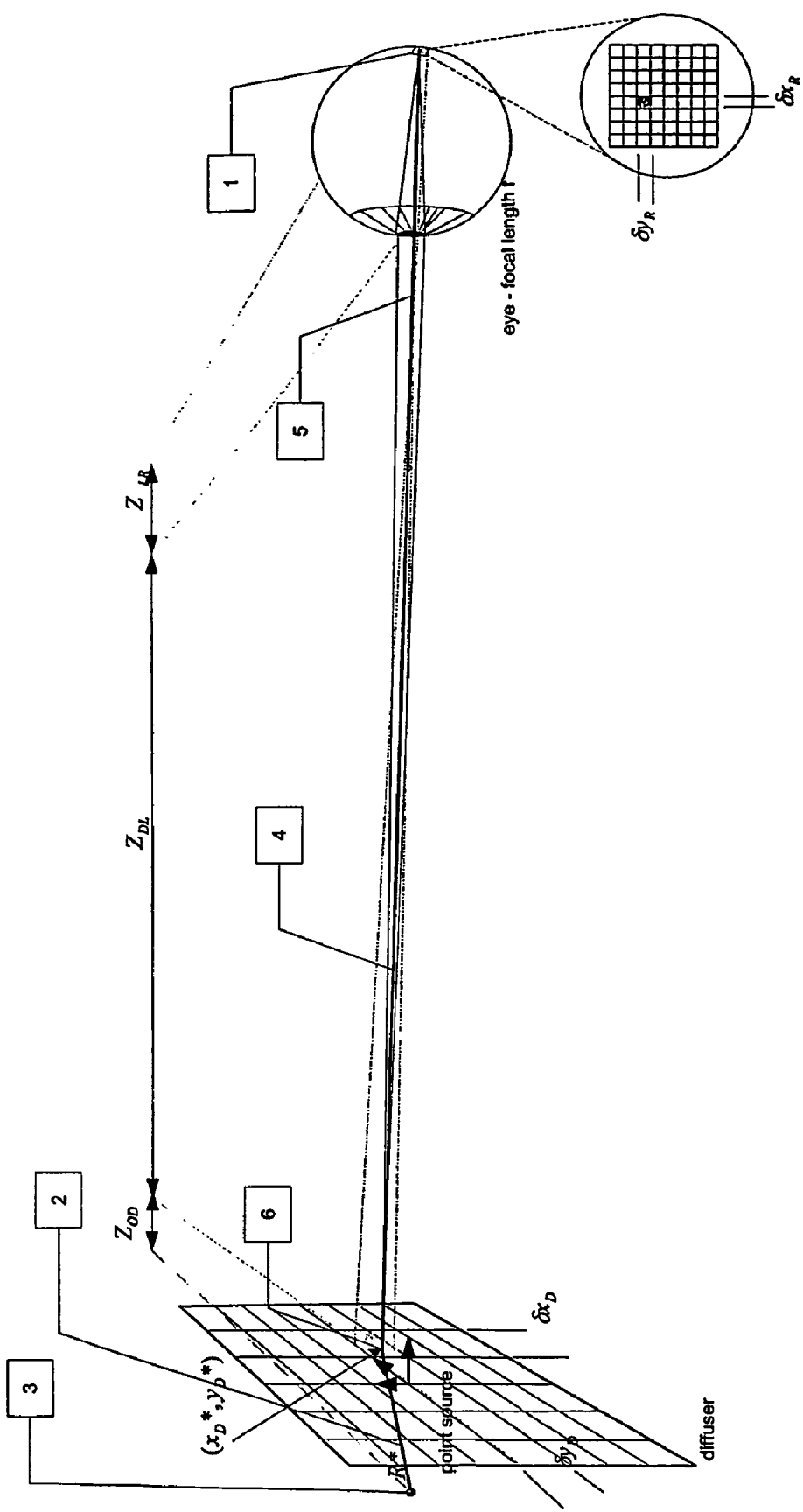
FIG. 1 shows the setup for the working that shows how the point spread function can be calculated from the bi-directional transmission distribution function of the spatial filter

To determine the effect of a diffusion element on small features, such as font elements, on the an imaging layer consider the somewhat simplistic optical system shown in FIG. 1.

For the purposes of the metric and further modelling, the point spread function of the system in terms of the BTDF of the diffuser and its distance from the rear display is required. Since the image quality on the rear imaging layer is being examined the front imaging layer is not needed. The eye is modelled as a thin lens system where the images are focused on the fovea (1), a small region of the retina with very high cone density, at an angle of about 6-8 degrees to the optic axis. These "flat retina" and "thin lens" approximations are acceptable because the fovea forms such a small portion of the curved retina. Table 1 introduces all of the relevant notation.

| | |
|---|---|
| x, y, z | x, y, z coordinates |
| $Z_{OD}$ | Distance along z axis between object and diffuser |
| $Z_{DL}$ | Distance along z axis between diffuser and lens |
| $Z_{LR}$ | Distance along z axis between lens and retina |
| $R_{OD}^*$ | Ray from object to diffuser |
| $R_{DL}^*$ | Ray form diffuser to lens |
| $R_{LR}^*$ | Ray from lens to retina |
| $\delta A_D$ | Small area surrounding the intersection of ray we are following with diffuser plane |
| $\delta A_R$ | Small area surrounding the intersection of ray we are following with retina plane |
| $\Omega_{OD}$ | Solid angle formed between point source and $\delta A_D$ |
| $\Omega_{DL}$ | Solid angle formed between the intersection of the ray we are following and the diffuser plane |
| M | Magnification of the lens system |
| $|\ |$ | Modulus of a vector |
| $\|\ \|$ | Norm of a vector |
| $\rightarrow$ | Direction of optic flow |
| $\omega_i$ | $\|R^*_{OD}\|$ |
| $\omega_o$ | $\|R^*_{DL}\|$ |

To begin the analysis the object layer is partitioned into a fine grid $$G_O = \begin{Bmatrix} (x_1, y_1) & (x_2, y_1) & \cdots & (x_m, y_1) \\ (x_1, y_2) & \ddots & & (x_n, y_2) \\ \vdots & & \ddots & \vdots \\ (x_1, y_m) & (x_2, y_n) & \cdots & (x_m, y_n) \end{Bmatrix} \qquad (1)$$

which is mapped by the thin lens, focused to give a magnification M, to a grid on the retina $$G_R = -M \begin{Bmatrix} (x_1, y_1) & (x_2, y_1) & \cdots & (x_n, y_1) \\ (x_1, y_2) & \ddots & & (x_n, y_2) \\ \vdots & & \ddots & \vdots \\ (x_1, y_m) & (x_2, y_m) & \cdots & (x_n, y_m) \end{Bmatrix} \qquad (2)$$

The negative sign implies that the x coordinate has been reflected in the y axis and vice versa. Initially the position is required, so follow the path of a generalised ray R* from a point at $(x_O^*, y_O^*)$ (2) behind the diffuser which is broken into three sections, $\tilde{R}^*_{OD}$ (3), $\tilde{R}^*_{DL}$ (4), and $\tilde{R}^*_{LR}$ (5) each a vector. $\tilde{R}^*_{OD}$, whose direction is described by the inclination angles $\theta_H, \theta_V$ (5) resolved into components in the horizontal z-x plane and vertical z-y plane respectively, is redirected by the diffuser at the point $$(x_D^*, y_D^*) = (Z_{OD} \tan(\theta_H), Z_{OD} \tan(\theta_V)) \qquad (3)$$

Think of the point $(x^*_D, y^*_D)$ (6) as a new object which is then imaged by the thin lens. To determine the surrounding grid element at the retina take the imaged point and divide the x and y coordinates at the fovea by the grid size and round up to the nearest integer $$(x^*_R, y^*_R) = \left(\frac{x^*_D}{M}, \frac{y^*_D}{M}\right) \quad (4)$$

$$(x^*_R, y^*_R) = \left(\text{ceil}\left\{\frac{x^*_F}{\delta x_F}\right\}, \text{ceil}\left\{\frac{y^*_F}{\delta y_F}\right\}\right) \quad (5)$$

If the irradiance of the of the light entering the diffuser contained within a small solid angle is known the output luminance on the exit side at that point is determined from $$L_D(\omega_0) = L_O(\varpi_i) f_s(\varpi_i \to \omega_o) \Omega_D(\varpi_i) \quad (6)$$

$$= L_O(\varpi_i) f_s(\varpi_i \to \omega_o) \frac{\delta A_D}{|R_{OD}|^2}$$

$$= L_O(\varpi_i) f_s(\varpi_i \to \omega_o) \frac{\delta A_D}{\frac{(x_D - x_O)^2}{M^2} + \frac{(y_D - y_O)^2}{M^2} + Z^2_{OD}}$$

$$f_s = \frac{dL_O(\varpi_o)}{L_i(\omega_i) d\Omega(\varpi_i)}$$

is the bidirectional transmittance function for the diffuser element where $$\omega_i = \|R^*_{OD}\|$$

$$\omega_o = \|R^*_{DL}\| \quad (7)$$

Now the illuminance at the lens is $$E_L = L(\theta_H, \theta_V) \delta \Omega_{DL} \quad (8)$$

$$= L_O(\theta_H, \theta_V) \frac{A_{lens}}{|R^*_{DL}|^2}$$

$$= L_O(\theta_H, \theta_V) \frac{A_{kens}}{4\pi \left[\frac{x^2_D}{M^2} + \frac{y^2_D}{M^2} + Z^2_{DL}\right]}$$

And the flux through the lens is $$\Phi_{lens} = E_L A_{lens} \quad (9)$$

$$= L_O(\theta_H, \theta_V) \frac{A^2_{kens}}{4\pi \left[\frac{x^2_D}{M^2} + \frac{y^2_D}{M^2} + Z^2_{DL}\right]}$$

To find the illuminance imaged at each grid area on the retina by the lens, which is the stimulus at that area, take the flux through the lens and divide it by the area of the corresponding grid element $$E_v \Big|_{\substack{x_R \\ y_R}} \cong \frac{\Phi_{Lens}}{\delta A_R}$$

So $$E_v \Big|_{\substack{x_R \\ y_R}} = \frac{f_s(\varpi_i \to \varpi_o) L_O(\theta_H, \theta_V) A^2_{Lens}}{\left(\frac{(x_D - x_O)^2}{M^2} + \frac{(y_D - y_O)^2}{M^2} + Z^2_{OD}\right)\left(\frac{x^2_R}{M^2} + \frac{y^2_R}{M^2} + Z^2_{DL}\right)} \frac{\delta A_O}{\delta A_R} \quad (10)$$

However the result is required to be independent of the grid and so dissolve the ratio on the right hand side. The $$\lim_{\delta A_R \to 0} \frac{\delta A_D}{\delta A_R} = \frac{\partial A_O}{\partial A_R} \quad (11)$$

for $\delta A_F = f(\delta A_O)$ and since $$\delta A_R = \delta x_R \delta y_R = M \delta x_O M \delta y_O \quad (12)$$
$$= M^2 \delta x_O \delta y_O = M^2 \delta A_O$$

$$\frac{\partial A_F}{\partial A_O} = M^2 \quad (13)$$

and finally $$PSF(x_D, y_D, Z_{OD}, Z_{LD}) = \frac{f_s(\varpi_i \to \varpi_o) L_O(\theta_H, \theta_V) A^2_{pupil}}{\left(\frac{(x_D - x_O)^2}{M^2} + \frac{(y_D - x_O)^2}{M^2} + Z^2_{OD}\right)} M^2 \quad (14)$$

$$\left(\frac{x^2_R}{M^2} + \frac{y^2_R}{M^2} + Z^2_{DL}\right)$$

where $$\theta_H = \tan^{-1}\left(\frac{x_R}{MZ_{OD}}\right)$$

$$\theta_V = \tan^{-1}\left(\frac{y_R}{MZ_{OD}}\right)$$

Figure 2:
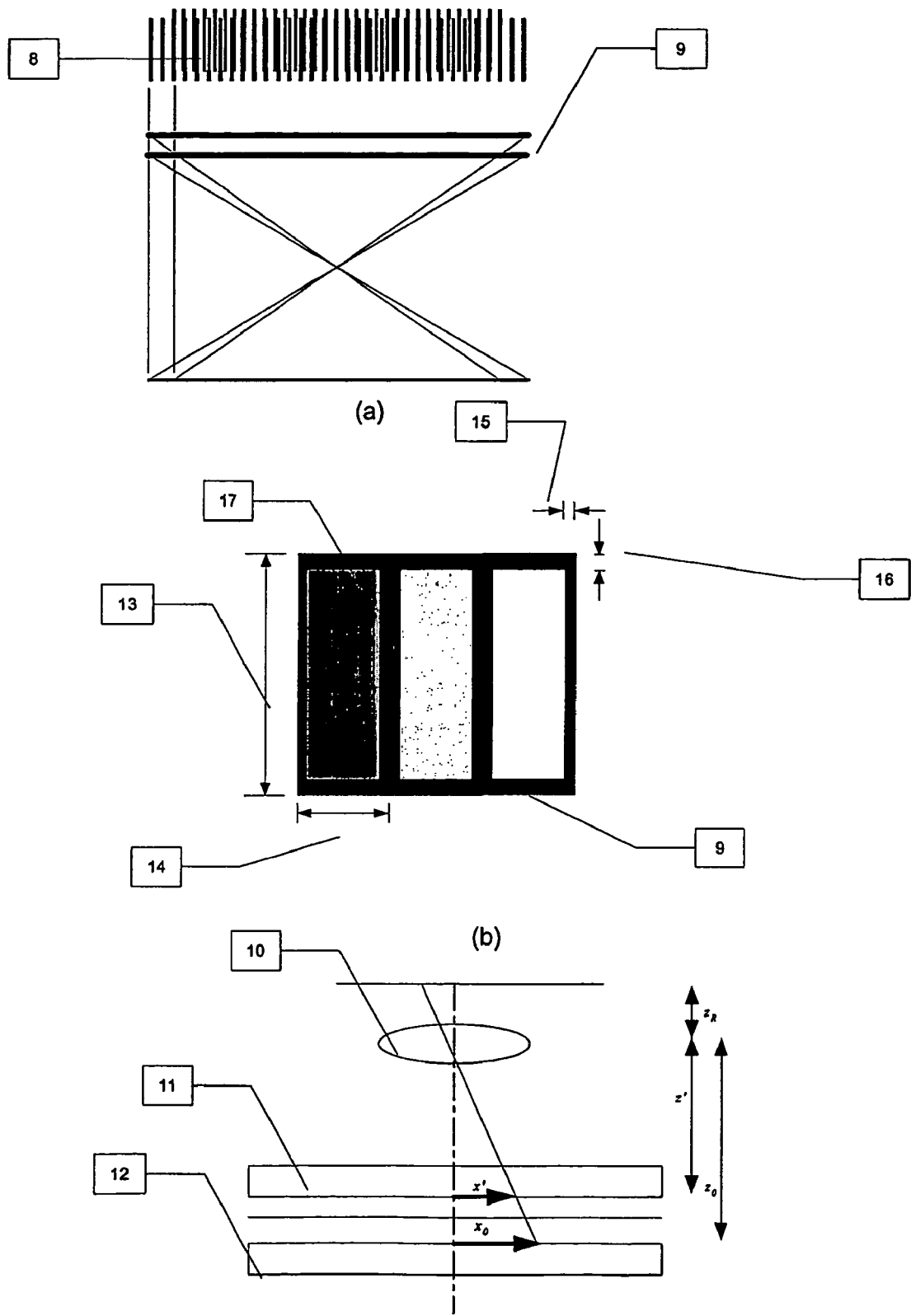
FIG. 2 shows the setup for the working that shows how the moiré interference is described

An intuitive way to think about moiré is shown in FIG. 2 which shows two gratings of slightly different wavelengths (7) overlaid. When each of these screens is imaged by the lens on the same plane there is interference (8) between two square waveforms of slightly different frequency—which, considering how the average density varies across the screen, produces a beating pattern.

The following describes, in a rigorous way, how this beating phenomenon occurs in multi-layered imaging systems. The situation presented in FIG. 2a is similar for LCD panels that are spaced apart and have regularly sized and spaced apertures containing red, green and blue filters.

Each filter of, each layer, is modelled separately with the spectral transmission function. This is overlaid upon a scaled 2D square wave with Lambertian luminance of $BL_0$ or zero for the rear imaging layer; and a transmittance of one or zero for the front imaging plane. The origin of this wave is at the optical axis shown as the vertical centre line on FIG. 2c. The black matrix (9) is included implicitly in this setup. The luminance/transmission functions are expressed mathematically in Equations 15 and 16 where the symbols are defined in FIG. 3. The multiplication is expressed in the horizontal and vertical vectors in Equation 3. This idea is $$\begin{bmatrix} F(x, y)_{Red} \\ F(x, y)_G \\ F(x, y)_B \end{bmatrix} = \begin{bmatrix} \begin{cases} 1\_if\_M_F(BM_{X,F} + 0P_{X,F} + n_x P_{X,F}) < x < M_F(BM_{X,F} + (P_{X,F} - 2BM_{X,F}) + n_x P_{X,F}) \\ \quad M_F BM_{Y,F} < y < M_F(n_y P_{Y,F} - BM_{Y,F}) \\ 0\_otherwise \end{cases} \\ \begin{cases} 1\_if\_M_F(BM_{X,F} + 1P_{X,F} + n_x P_{X,F}) < x < M_F(BM_{X,F} + (2P_{X,F} - 2BM_{X,F}) + n_x P_{X,F}) \\ \quad and\_M_F BM_{Y,F} < y < M_F(n_y P_{Y,F} - BM_{Y,F}) \\ 0\_otherwise \end{cases} \\ \begin{cases} 1\_if\_M_F(BM_{X,F} + 2P_{X,F} + n_x P_{X,F}) < x < M_F(BM_{X,F} + (3P_{X,F} - 2BM_{X,F}) + n_x P_{X,F}) \\ \quad and\_M_F BM_{Y,F} < y < M_F(n_y P_{Y,F} - BM_{Y,F}) \\ 0\_otherwise \end{cases} \end{bmatrix} \quad (15)$$

obviously portable to other technologies and optical configurations which could form the basis of multi-layered displays.

The assignments in Equations 15 and 16 may look a confusing to the reader but the pattern within the braces is rather simple and the general form shown above it $$\frac{\phi}{\text{initial\_phase\_shift}} + n\_\underset{\text{period}}{P} < z < \frac{\phi}{\text{initial\_phase\_shift}} + \frac{\Delta z}{\text{change\_in\_distance}} + n\_\underset{\text{period}}{P} \quad (16)$$

$$\begin{bmatrix} R(x, y)_{Red} \\ R(x, y)_G \\ R(x, y)_B \end{bmatrix} = \begin{bmatrix} \begin{cases} 1\_if\_M_R(BM_{X,R} + 0P_{X,R} + n_x P_{X,R}) < x < M_R(BM_{X,R} + (P_{X,R} - 2BM_{X,R}) + n_x P_{X,R}) \\ \quad M_R BM_{Y,R} < y < M_R(n_y P_{Y,R} - BM_{Y,R}) \\ 0\_otherwise \end{cases} \\ \begin{cases} 1\_if\_M_R(BM_{X,R} + 1P_{X,R} + n_x P_{X,R}) < x < M_R(BM_{X,R} + (2P_{X,R} - 2BM_{X,R}) + n_x P_{X,R}^{20}) \\ \quad and\_M_R BM_{Y,R} < y < M_R(n_y P_{Y,R} - BM_{Y,R}) \\ 0\_otherwise \end{cases} \\ \begin{cases} 1\_if\_M_R(BM_{X,R} + 2P_{X,R} + n_x P_{X,R}) < x < M_R(BM_{X,R} + (3P_{X,R} - 2BM_{X,R}) + n_x P_{X,R}) \\ \quad and\_M_R BM_{Y,R} < y < M_R(n_y P_{Y,R} - BM_{Y,R}) \\ 0\_otherwise \end{cases} \end{bmatrix}$$

The layers are then set-up as shown in FIG. 2c. This situation can be simplified by considering the same image produced on the retina by the rear layer, but where the rear layer is moved very slightly behind the front layer and suitably scaled. This will allow us to determine the final image with point by point multiplication of the separate layers. The use of radiometric rather than photometric quantities is required since the various filters need to be modelled. To scale this object, such that the image on the retina remains the same examine FIG. 2c. Start with the fact that the area has to be preserved and from thin lens theory it is know that $$x_R = \frac{z_0}{z_R} x_o = \frac{z'}{z_R} x' \Leftrightarrow x' = \frac{z_0}{z'} x_0$$

and similarly $$y' = \frac{z_0}{z'} y_0.$$

The illuminance on a plane a distance z away from a flat surface imaged by a thin lens (10) is $$E = \frac{\Phi}{a} = \frac{LA'S}{az'^2} \cos^4(\theta) \quad (17)$$

$$= \frac{L\left(\frac{z_o}{z'}\right)^2 AS \cos^4(\theta)}{az'^2}$$

$$= \frac{LAS \cos^4(\theta)}{az^2} \quad (18)$$

where S is the area of the lens (10), L is the luminance of the rear display (11), A is the area of a small element on the rear display (12), a is a small element on the lens, Φ is the flux and E is the irradiance. This turns out to be the same no matter how far the rear panel is away from the lens. Take the diffuser into account by convolving the rear display image with the point source before changing its scale. To get the irradiance at the retina combine all of the separate layers using point by point multiplication and sum them as in Equation 19.

$$E(x, y) = \qquad (19)$$

$$\frac{\sum_{\substack{i=1...m \\ j=1...n}}^{m,n} BL_0 \cdot \left( PSF(x, y) * \begin{bmatrix} R(x, y)_R T(\lambda)_{Red,R} \\ R(x, y)_G T(\lambda)_{G,R} \\ R(x, y)_B T(\lambda)_{B,R} \end{bmatrix} \right)}{z'^2}$$

$$\frac{[F(x, y)_R T(\lambda)_{Red,F} F(x, y)_G T(\lambda)_{G,F} F(x, y)_B T(\lambda)_{B,F}] M^2 A_{lens} \cos^4(\theta)}{z'^2}$$

Where $BL_0$ is the radiance of the backlight, $PSF(x,y)$ is the point spread function described earlier, $T_{Red}$, $T_G$ and $T_B$ are the spectral transmission functions of the dye layers of the where second subscripts R and F designate the front and rear imaging layers respectively, M is the magnification of the thin lens system given by $z'/z_O$ and $A_{lens}$ is the area of the lens.

Since visual perception is very difficult to measure directly, and varies from person to person an external reference to measure the image quality of a display is required. In most work the external reference is a physical artefact that transforms radiometric quantities into numbers. For these numbers to be useful they should have at least the following two properties: (a) If the numbers describing an aspect of image quality are the same for two displays then when asked observers comparing the two displays should report that this aspect of image quality is the same (b) If the numbers describing associated with two different displays are different then an observer should be able to report which has the greater magnitude. A third useful property is where the numbers describing the magnitude of a measured quantity agree with the magnitude described by an observer. Here we are interested with two conflicting quantities (a) image "clarity" of background layers which is compromised in a MLD to reduce the (b) saliency of moiré interference produced. Vision science provides a description of the response to spatial frequency, the contrast sensitivity function (CSF), which is good starting point for producing the map between the response of the physical artefact and the "useful numbers" described. The CSF plots the contrast sensitivity (1/cutoff contrast) against angular frequency for human observers.

$$CSF(\omega) = a\omega e^{-b\omega} \sqrt{1 + 0.06 e^{b\omega}} \qquad (20)$$

$$a(\omega, L) = \frac{540\left(1 + \frac{0.7}{L}\right)^{-0.2}}{1 + \frac{12}{p\left(1 + \frac{1}{3}\omega\right)^2}}$$

$$b(L) = 0.3\left(1 + \frac{100}{L}\right)^{0.15}$$

Where L is the average display luminance, p is the angular display size in degrees and $\omega$ is the angular frequency in cycles per radian related to the angular frequency of the display (cycles per radian) by $$\omega = dv \qquad (21)$$

Additionally there is no widely agreed standard for the contrast sensitivity function yet which describes the spatial response of the human visual system. At present there are several contenders which could be named as standard by the CIE, so in a preferred embodiment the CSF that becomes the standard for the art would be incorporated A naïve display engineer about to place one image layer upon another would not expect Moiré interference or the spatial qualities of the image on the rear display to differ. This is the ideal specification. This is better expressed by stating that only the difference between two sets of images matters.

An image of text on the rear display diffused and the ideal un-diffused case, with the representations $F_{D'}$, $F_D$ in the frequency domain.

An image of the moiré interference produced between the two layers and the ideal case of a uniform white surface the same area as the front most imaging layer, with the representation $F_M, F_{M'}$ in the frequency domain.

The square root integral function compares an original and a distorted image where signal components are weighted by the contrast sensitivity function, and the result is expressed in just noticeable differences (JND). One JND between the two images would mean a difference that was noticeable half of the time. The Square Root Integral (SQUI) is calculated as $$J = \frac{1}{\ln(2)} \int_{v_o}^{v_{max}} \sqrt{\frac{M(v)}{M_t(v)}} \, 28 \, d(\ln(v)) \qquad (22)$$

where $$M(v) = \left| \frac{F_{X'}(v)/F_X(0)}{F_X(v)/F_X(0)} \right|$$

is defined as the modulation transfer function where $F_{X'}(v)$ and $F_X(v)$ are representations of the distorted and undistorted images in the frequency domain respectively and $F_X(0) = F_{X'}(0)$ are the average luminance's of the distorted and undistorted images $$M_t = \frac{1}{CSF(\omega(v))}$$

where $CSF(\omega)$ is the contrast sensitivity function

To find the distortion of our multi-layered display from the ideal in terms of JDN's use the following sum:

$$D_1 = \frac{1}{\ln(2)}\int_{v_o}^{v_{max}}\sqrt{\frac{M_{D_o}(v)}{M_t(v)}}\,d(\ln(v)) - \frac{1}{\ln(2)}\int_{v_o}^{v_{max}}\sqrt{\frac{M_D(v)}{M_t(v)}}\,d(\ln(v)) \quad (23)$$

$$D_2 = \frac{1}{\ln(2)}\int_{v_o}^{v_{max}}\sqrt{\frac{M_{M_o}(v)}{M_t(v)}}\,d(\ln(v)) - \frac{1}{\ln(2)}\int_{v_o}^{v_{max}}\sqrt{\frac{M_M(v)}{M_t(v)}}\,d(\ln(v))$$

$$D = D_1 + D_2$$

where $v_o$ is the smallest spatial frequency viewable on the display corresponding to the size of the display and $v_{max}$ is the maximum frequency viewable by the human visual system.

The first metric compares the filtered layer to the unfiltered layer. The second term in the metric compares the representation of the front screen to the back screen combination to the retinal of the front screen by itself. In a preferred embodiment the spectral information is calculated such that it forms each sub-term of the metric is calculated via the square root integral.

Many other metrics incorporating the contrast sensitivity function of the human visual system may be employed including the Modulation Transfer Function Area.

According to another embodiment of the present invention there is provided an algorithm for predicting and optimising the trade-off between moiré interference and image quality by use of a spatial filter within a multi-layered image system where said layers contain periodic elements.

As shown in FIG. 2b display architecture is specified to algorithm which may include but is not limited to the following (a) the shape and dimensions of each pixel or sub-pixel (13,14), and the width of the black matrix (15,16) that surrounds the pixel or sub-pixel, which form the cell attached to each point on the lattice (b) The chromaticity co-ordinates of combinations of pixels or sub-pixels (17) of substantially the same or of different spectral absorption or emission characteristics on different layers.

For example with two layers, each layer with RGB sub-pixels, the chromaticity co-ordinates of the following combinations are necessary

|   | R | G | B |
|---|---|---|---|
| R | RR (x, y) | RG (x, y) | RB (x, y) |
| G | GR (x, y) | GG (x, y) | GB (x, y) |
| B | BR (x, y) | BG (x, y) | BB (x, y) |

Where, for example RR denotes a red sub-pixel is in front of a red sub-pixel, and (x,y) denotes the chromaticity co-ordinates measured when illuminated by a standard D65 source. Note that the combinations can be measured by using a commercially available photo-spectrometer, or calculated using Beer's law.

Note that because of the effects of interstitial optical layers the co-ordinates of RB do not equal BR for example. In the general 2D case the matrix is not symmetric about its diagonal, and in the nD case the elements of the matrix transpose are not equal.

Figure 3:
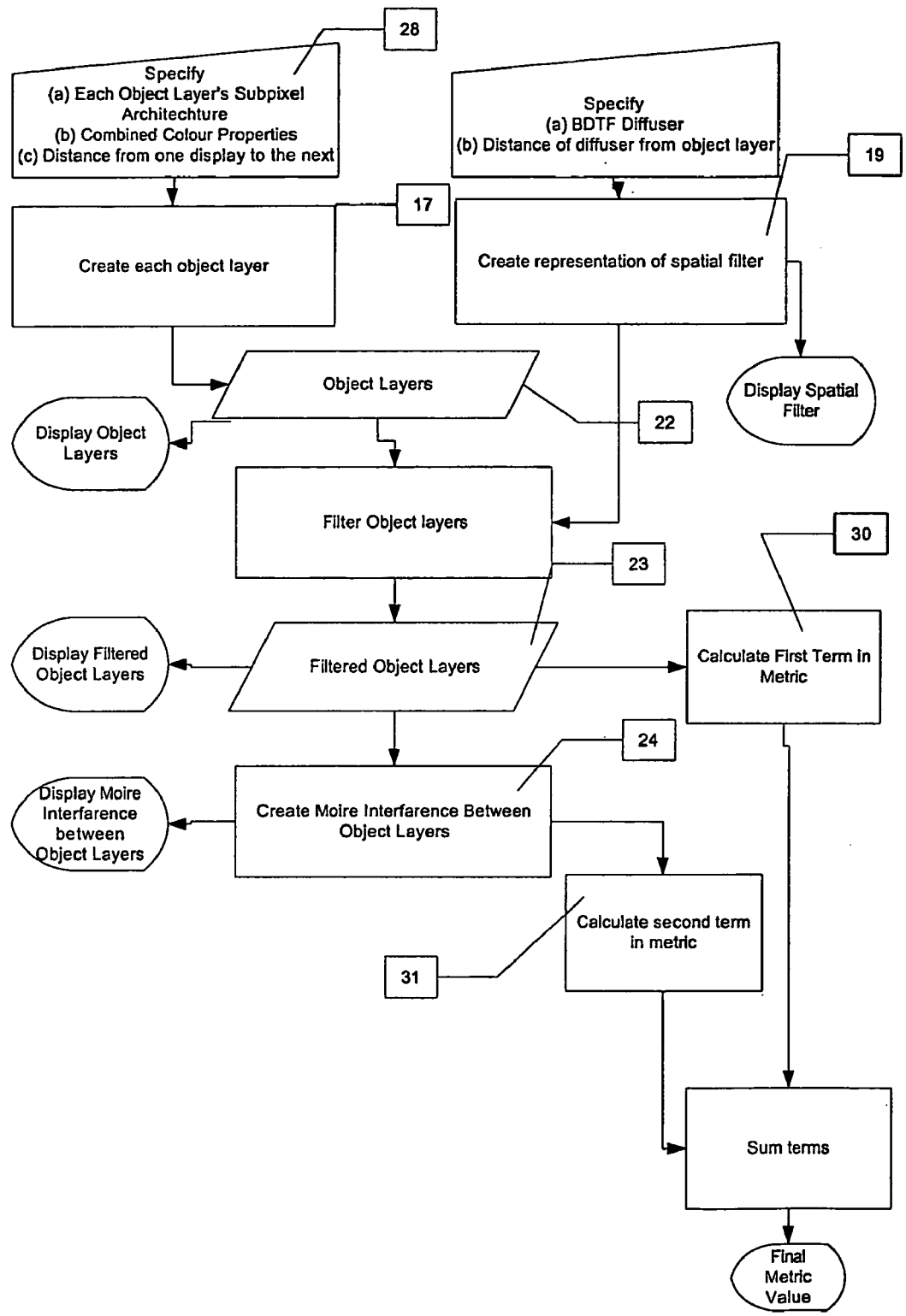
FIG. 3 is a flow chart describing the software embodiment of the present invention
Figure 4:
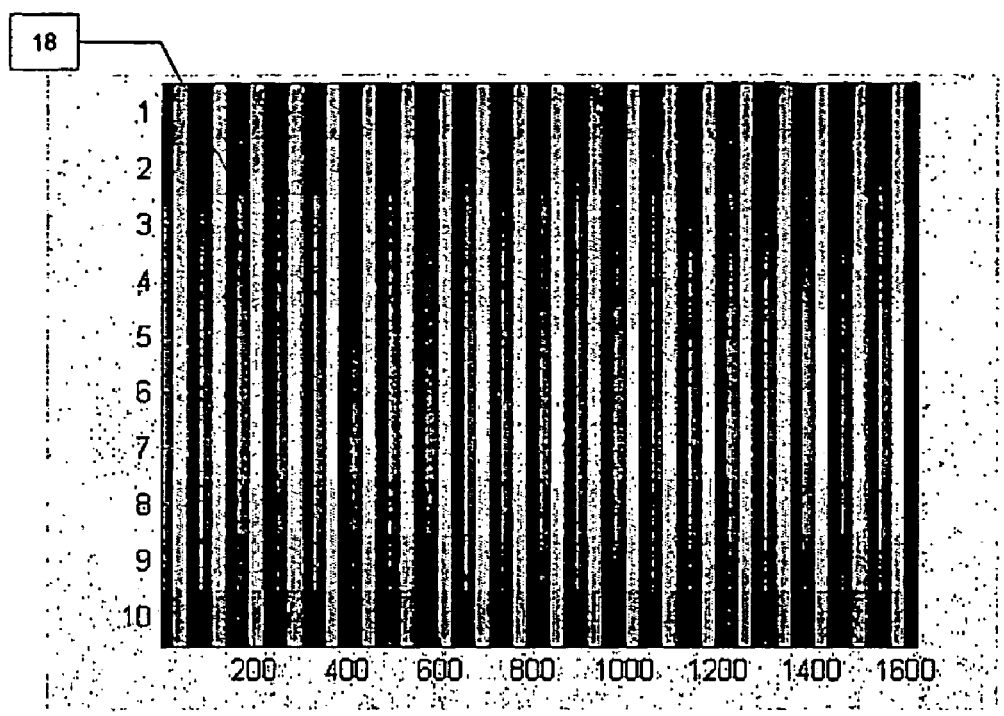
FIG. 4 shows the effect of the two different bidirectional spread functions of figure two on a simplified version of the vertical stripe pattern.
Figure 4:
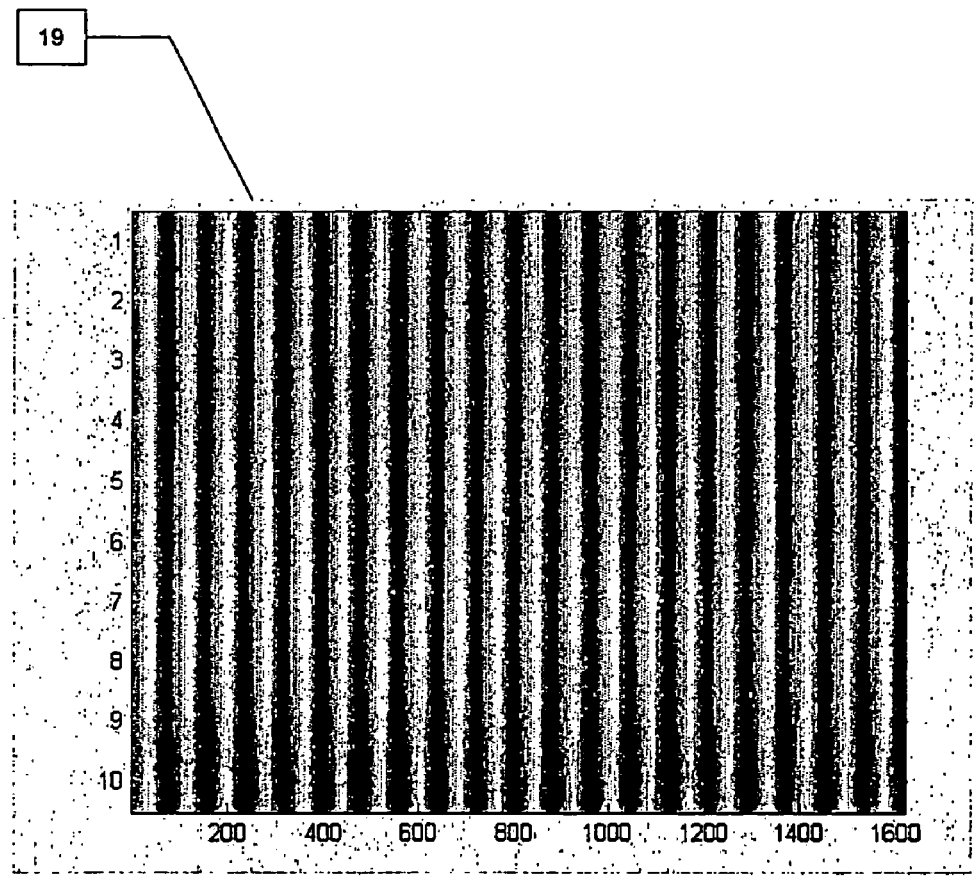
Figure 5:
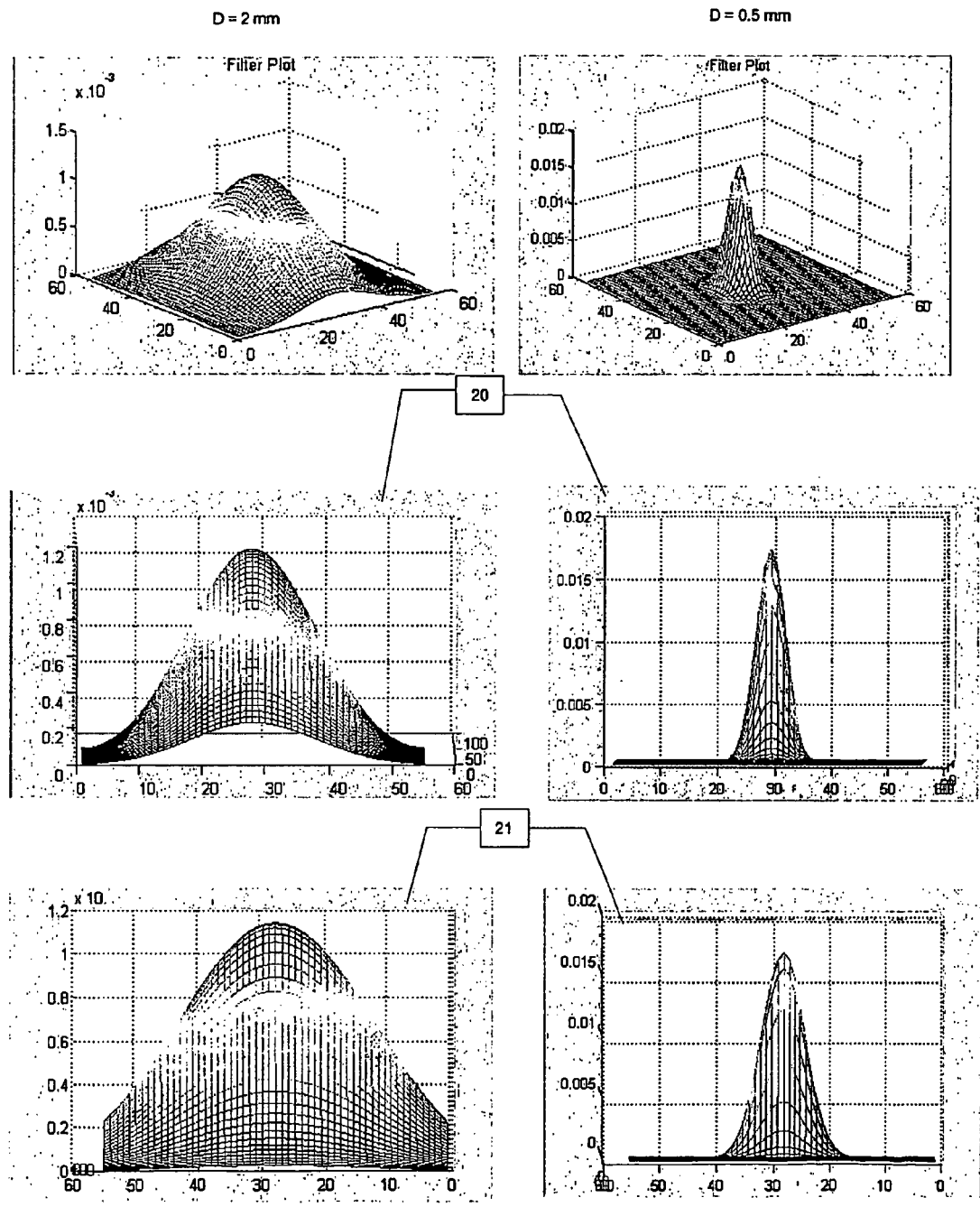
FIG. 5 is a graph of the bidirectional spread function, where the horizontal and vertical axes give the row and column number of the element respectively and the vertical axis potrays the weight.
Figure 6:
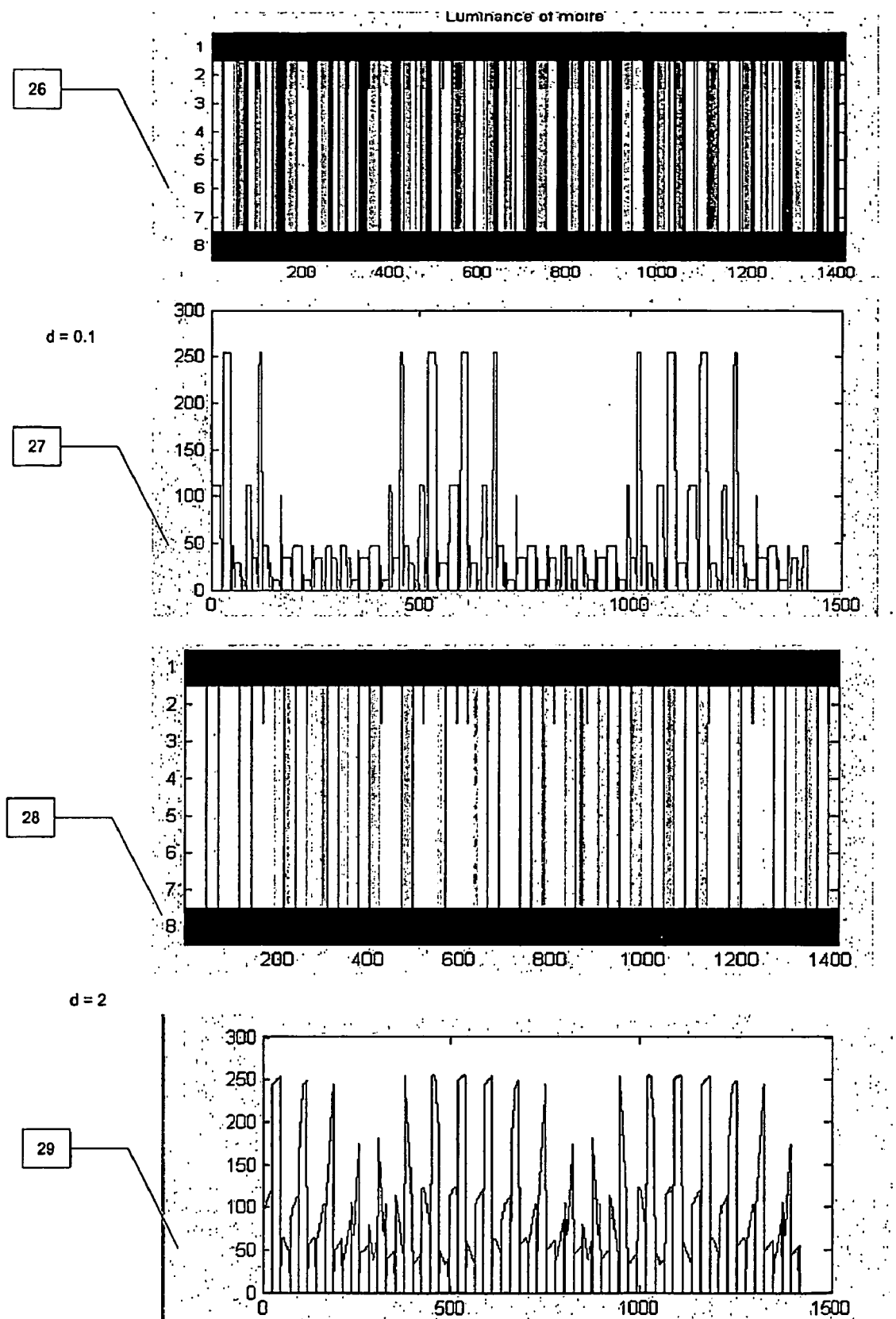
FIG. 6 shows the effect if narrower Vs wider bi-directional spread functions on the moiré interference

(d) The distance of one display layer to the next and the refractive index of interstitial elements between layers (e) An approximation to the bidirectional transmission distribution function of each filter (f) The distances of each spatial filter from each display layer The following MATLAB® code is provided by way of example only and details a possible implementation of the algorithm. The algorithm is in no way required to be implemented in MATLAB® and it should be appreciated that the comments in conjunction with FIG. 3 are sufficient to teach someone skilled in the art an implementation that is portable to any virtual or Turing machine. MATLAB® documentation, and the http links detailed in the notes section of each function are incorporated herein by way of reference.

The first section of code provides a top-down script controlling the execution of the functions detailed below

```
%Create the display

D.Pixels.h=20;

D.Pixels.v=1;

D.subpixel_s.h=27;

D.subpixel_s.v=10;

D.blackmatrix_s.v=1;

D.blackmatrix_s.h=1;

D.trans_s.h=2;

D.trans_s.v=2;

save D D;

load D ;

X=createDisplay(D);

image(X)

title('Single layer')

save X X;

load X;

X_blur = X;

%Create the filter
```

```
H=createfilter([15,10],2000,[27,27],1.5);
figure;
mesh(H);
figure;
mesh(H);
figure;
mesh(H);
title('Filter Plot')

%blur the rear display and use to create moire
sum(sum(sum(X_blur)));
  X_blur(:,:,1)=filter2(H,X(:,:,1));
  X_blur(:,:,2)=filter2(H,X(:,:,2));
  X_blur(:,:,3)=filter2(H,X(:,:,3));
figure
  image(X_blur/max(max(max(X_blur))));
  title('Blurred Layer')
figure;
  save X_blur X_blur;
  load X_blur;
  load CM;
%define viewing distance and distance between panels
DD=0.010
DE=0.07
X_m=createMoire(X_blur,X,DD,DE,CM);
colormap('gray')
midPixel=round((D.Pixels.v* D.subpixel_s.v)/2)
```

```
%plot the luminance of moire in 2D image(X_m(:,:,2)/(max(max(X_m(:,:,2))))*255);

title('Luminance of moire')

figure plot(X_m(midPixel,:,2)/(max(max(X_m(midPixel,:,2))))*255);

line=X_m(midPixel,:,2)/(max(max(X_m(midPixel,:,2))))*255;

%need the dimentions of the scaled display for the next section

S=size(X_m)

%now plot the moire luminance minus the original luminance figure

Xc = rgb2cie(X);

Xcn = (Xc(midPixel,:,2)./(max(max(Xc(midPixel,:,2)))))*255;

size(X_m(midPixel,:,2))

plot(abs(X_m(midPixel,:,2)-Xcn(S(2))))

image(abs(X_m(midPixel,:,2)-Xcn(S(2))))

%now look at fft of this result y=fft(abs(X_m(midPixel,:,2)/Xcn(S(2))));

figure loglog(sqrt(real(y).^2 + imag(y).^2))

title('Fast fourior transform of difference between images')

%calculate the number that corrisponds to the cut off frequency

N = round((D.Pixels.h*D.subpixel_s.h*1e-5*55*180)/(pi*DE))
```

The following function is a possible implementation of (17) on

Figure 3. Visual output (18) is shown in figure (4).

```
%_____%
%------------------function createDisplay(D)----------------------%
%Creates a display layer                        %
%-----------------------------Variables---------------------%
% D, where D is the following data structure        %
%D.Pixels.h      -number of horizontal pixels
%D.Pixels.v      -number of vertical pixels
%D.subpixel_s.h   -size of the subpixel in micrometers (horizontal)
%D.subpixel_s.v   -size of the subpixel in micrometers (vertical)
%D.blackmatrix_s.v -size of the black matrix in micrometers (horizontal)
%D.blackmatrix_s.h -size of the black matrix in micrometers (vertical)
%D.trans_s.h     -size of the transistor in micrometers (horizontal)
%D.trans_s.v     -size of the transistor in micrometers (vertical)
%----------------------------Notes----------------------------%
%You should imagine the finished data structure as three seperate layers
%with a colour for each
%_____%

%Make the display, should be on three seperate layers
subpixel_s=[D.subpixel_s.h,D.subpixel_s.v];
blackmatrix_s=[D.blackmatrix_s.h,D.blackmatrix_s.v];
trans_s=[D.trans_s.h,D.trans_s.v];
red   = subpixel([1,0,0],subpixel_s,blackmatrix_s,trans_s,0);
green = subpixel([0,1,0],subpixel_s,blackmatrix_s,trans_s,0);
blue  = subpixel([0,0,1],subpixel_s,blackmatrix_s,trans_s,0);
pixel = [red green blue];
```

The following function is a possible implementation of (19) on
Figure (3) and graphs for the filter at 2 mm and 0.5 mm from the object layer in the
horizontal direction (20) and the vertical direction (21) are shown on Figure (5)

```
%===============================================================% function H = createFilter(FWHMd,OD,size,N)

%-------------------createFilter(FWHM,OD,size,N)-------------------%

%This creates an image filter from the POC diffuser given the FWHM
%characteristics, its distance from the display, the required size of the
%filter in pixels and the refractive index of the intersticial optical
%layer
%-----------------------------Variables----------------------%
%FWHMd - [horizontal FWHM, vertical FWHM ] in specification space
%OD - z co-ordinate of diffuser in specification space
%size - vector containing the number of vertical and horizontal pixels
%respectively required for the filter - matrix notation!!!
%N - the refractive index of the interstical optical layer
%--------------------------------Notes------------------------------%
%reference : http://mathworld.wolfram.com/GaussianFunction.html
%We make a couple of assumptions here:
% - the bidirectional spread function of the diffuser is constant for any
%input angle
%_____%
%save the world from bad input
if FWHMd(1)>=90 | FWHMd(2)>=90
    error('FWHM angles must be less than 90 degrees')
end
```

```
if N < 1
    error('Refractive index must be greater than 1.0')
end
%read off the values from the vector to make code easier to understand
m=size(1)
n=size(2)
%construct the x,y values to go through the function in a y*x*2 matrix
    %first construct the values of the rows and columns
    x = [-n:1:0,1:n]
    y = [-m:1:0,1:m]
    %use the outer product to replicate these values
    A(:,:,1)=rot90(ones(2*m+1,1)*x)
    A(:,:,2)=ones((2*n+1),1)*y
%convert the diffuser specification from degrees to radians
FWHMr = (FWHMd/180)*pi
%calculate the apparent distance
OD = OD/N
%calculate the filter boundaries in terms of the full width half maximum
FWHM(1) = abs(OD*tan(FWHMr(1)))
FWHM(2) = abs(OD*tan(FWHMr(2)))
%convert from full width half maximum to the standard deviation of the gaussian
sigma=fwhm2sigma(FWHM)
%calculate the un-normalized gaussian filter
Hu=(1/(2*pi*sigma(1)*sigma(2))) * exp(-((A(:,:,1).^2/(2*sigma(1)^2)) + A(:,:,2).^2./(2*sigma(2)^2)))
%normalize - the image energy should be invariant
Hn=Hu/sum(sum(Hu))
```

%output the value

H=Hn;

function out = cie2rgb(in)

The following function converts between CIE and RGB co-ordinates

%_____%

%-------------------function out = cie2rgb(in)--------------%

%converts an image that expressed in tristumulus co-ordinates into RGB %

%co-ordinates

%----------------------------Variables----------------------%

% in is the image in CIE 1931 tristimulus values (XYZ)

%----------------------------Notes----------------------%

% Reference:

% http://www.cs.rit.edu/~ncs/color/t_convert.html

% if the values are not within 0 and 1 then we truncate

%_____% cie=in

%This matrix defines the conversion from rgb to CIE1931

A= [3.240479 -1.537150 -0.498535; -0.969256 1.875992 0.041556; 0.055648 -0.204043 1.057311]

% These equations transform cie in [0,1] to CIE out(:,:,1) = A(1,1)*cie(:,:,1) + A(1,2)*cie(:,:,2) + A(1,3)*cie(:,:,3);

out(:,:,2) = A(2,1)*cie(:,:,1) + A(2,2)*cie(:,:,2) + A(2,3)*cie(:,:,3);

out(:,:,3) = A(3,1)*cie(:,:,1) + A(3,2)*cie(:,:,2) + A(3,3)*cie(:,:,3);

%truncate the negative values out(out<0) = 0 out(out>1) = 1 function I = addImages(i1,i2)

function Moire = createMoire(R,F,DD,DE,CM)

The following function is a possible implementation of (22,23,24) on
Figure 3. Output is shown on figure (5) and (6). The effect on
Moiré interference with the filter at 0.1 mm (26,27) and 2 mm (28,29) is apparent by
considering the lesser amplitude of the beating pattern in (27) compared to
( 29).

```
%--------------------createMoire(R,F,DD,DE,CM)-----------------------%

%Adds the colours of two images.  If the images are of a different size %

%then we take the intersection of the two starting from the top right

%hand corner

%---------------------------------Variables-----------------------%

% R - the rear image in RGB co-ordinates

% F - is the front image in RGB co-ordinates

% DD - is the distance between the image layers

% DE - is the distance from the front most display to the eye

% CM - is the matrix that describes how the colours interact

%----------------------------------------------------------------%

%the way in which we scale the displays in incorrect at present.  This is

%the thrust of today's work

%_____%

%scale the displays

%note that this is physically incorrect at the moment

D1 = DD+DE;

D2 = DE;

FS = imresize(F,(D2/D1));

S_FS=size(FS);
``` x=1:S_FS(1);

y=1:S_FS(2);

%multiply each layer pointwise - we are trying to find where in space each layer interacts %and at present this is an RGB before hand, but we seperate each of the layers out and %and interact the red layer of the front screen with the red layer of the rear screen %for example until we have all nine combinations. Each one of these combinations can be %is the luminance distribution for that colour combination A1=ones(size(FS,1),size(FS,2),3,3,3);

for k=1:3 for m=1:3

A1(:,:,k,m,1) = R(x,y,k) .*FS(:,:,m) * CM(k,m,1);

end end

%Now for each combination k,l we need to assign CIE co-ordinates for k=1:3 for m=1:3

A1(:,:,k,m,2) = ones(size(A1,1),size(A1,2))*CM(k,m,2);

A1(:,:,k,m,3) = ones(size(A1,1),size(A1,2))*CM(k,m,3);

end end

%change to tristimulis values so that we may take the arithmetic sum for k=1:3 for m=1:3

A2(:,:,k,m,:) = xyL2XYZ(A1(:,:,k,m,:));

end end

%Go through and add into a single image

A4 = sum(A2,3);

A5 = sum(A4,4);

%now change to rgb co-ordinates

A6 = cie2rgb(A5);

%normalise for display on the screen

%the if statement copes with the case where the maximum element is zero if (max(max(max(A6)))~=0)

image(A6*(1/max(max(max(A6)))));

else image(A6)

end

%return the CIE tristimulus values

Moire=A5;

function s = CSF(w,L,p)

The following function is part a possible implementation of (26,27) on Figure 3

%--------------------s = CSF(w,L,p)------------------------------------%

%Calculate the contrast sesitivity value of a give spatial frequency

%-----------------------------------Variables-----------------------%

%w - vector of spatial frequencies

%L - luminance

%p - the angular display size in degrees calculated from the square root

%of the picture area

```
%----------------------------------------------%
% Gareth Bell                                  %
% Date Created      21/02/03                   %
% Date Last Edited  21/02/03                   %
% Revision 0.2                                 %
%---------------------Notes--------------------%
%w3.hike.te.chiba-u.ac.jp/IEC/100/ PT61966/parts/part11/gemu-94.pdf
%page 9
%_____% b = 0.3*(1 + 100/L).^0.15;

a = 540 * ((1 + 0.7/L)^(-0.2))./(1 + 12./(p*(1+w/3).^2));

s = a.*w.*exp(-b.*w).*sqrt(1 + 0.06 .* exp(b*w));

function Fnew = interpolate(F,P,domainX,domainY)

%--------------interpolate(F,P,domainX,domainY)-----------------------%

%This aproximates the value of a function at a specific points between

%those that are defined by a numerically calculated function

%-----------------------------Variables------------------------%

%F - is a 2d matrix of function values

%domainX - describes the x inputs to give F

%domainY - describes the y inputs to give F

%P - is a 2xn matrix of points that need to interpolated

%TEST INPUT if (~sum(P(1,:) < min(domainX))==0) | (~sum(P(1,:) > max(domainX))==0 )
    error('One or more x values out of range')
end if (~sum(P(2,:) < min(domainY))==0) | (~sum(P(2,:) > max(domainY))==0 )
```

```
    error('One or more y values out of range')
end
%--------------------------------------------------------%
i = domainX
j = domainY
u = P(1,:)
v = P(2,:)
%Calculate the x and y differentials
dFdx = diff(F,1,1)
dFdy = diff(F,1,2)
%Get the deltas
uv = mymesh(u,v)
dudv = uv - floor(uv)
%Find the indexes of the u and v values
[N,binU] = histc(u,i)
[M,binV] = histc(v,j)
%Calculate the aproximation
UV=mymesh(binU+1,binV+1)
dz = dFdx(UV(:,:,1)).*dudv(:,:,1) + dFdx(UV(:,:,2)).*dudv(:,:,2)
%now find the function values
Fnew = F(binV+1,binU+1) + dz
%_____%

%--------------------function function out = cie2rgb(in)---------------%
%converts an image that expressed in RGB co-ordinates into tristimulus  %
%values
%----------------------------------Variables------------------------%
% in is the image in RGB values
```

% Revision 0.2                                  %

%--------------------Notes----------------------%

%% Reference:

% http://www.cs.rit.edu/~ncs/color/t_convert.html

%_____% rgb=in

%This matrix defines the conversion from RGB to CIE1931

A= [0.414253 0.357580 0.180423 ; 0.212671 0.715160 0.072169; 0.019334 0.119193 0.950227]

% These equations transform RGB in [0,1] to CIE out(:,:,1) = A(1,1)*rgb(:,:,1) + A(1,2)*rgb(:,:,2) + A(1,3)*rgb(:,:,3);

out(:,:,2) = A(2,1)*rgb(:,:,1) + A(2,2)*rgb(:,:,2) + A(2,3)*rgb(:,:,3);

out(:,:,3) = A(3,1)*rgb(:,:,1) + A(3,2)*rgb(:,:,2) + A(3,3)*rgb(:,:,3);

%_____%

%-------------------function stamp(Min,nRows,nCols)-----------------%

%makes nRows*nCols copies of a matrix Min            %

%----------------------Variables-----------------------%

% Min - the copy of the matrix that needs to be stamped      %

% nRows - the number of stamped rows

% nCols - the number of stamped columns

%--------------------Notes----------------------% row=Min;

for i=1:(nCols-1);

row=[row,Min];

end

M=[];

for i=1:(nRows);

M=[M;row];

End

The following function is a possible implementation of (28) on Figure 3. The data from figure 2a is used.

%_____
____ function ColourFilter = SubPixel(PixelColour,PixelSize,BlackMatrixSize,TransistorSize,show)

%function ColourFilter = SubPixel(PixelColour,PixelSize,BlackMatrixSize,TransistorSize,show)

%Pixel colour is vector with [R,G,B] as red green and blue components respectively %Pixel size is vector with [hPixelSize,vPixelSize] in micrometers %BlackMatrixSize is vector : [hTraceWidth,vTraceWidth] in micrometers %Transitor sixe is vector : [hTransistorSize,vTransistorSize] in micrometers %Image is plotted if show is true %Make Colour filter close all ColourFilter=ones(PixelSize(2),PixelSize(1),3);

for i=1:3 i;

ColourFilter(:,:,i)=ColourFilter(:,:,i).*PixelColour(i); %Make each layer of sub pixel a component of red, green or blue end %Add horizontal matrix and vertical matrix %Add left ends ColourFilter((1:BlackMatrixSize(1)),:,:)=0;

```
ColourFilter(:,(1:BlackMatrixSize(2)),:)=0;
```

%Add right ends' hEnd=PixelSize(1)-(BlackMatrixSize(2)-1);

vEnd=PixelSize(2)-(BlackMatrixSize(1)-1);

```
ColourFilter(:,(hEnd:PixelSize(1)),:)=0;
ColourFilter((vEnd:PixelSize(2)),:,:)=0;
```

TransistorSize

%Add transistor

```
ColourFilter((1:TransistorSize(1)),(1:TransistorSize(2)),:)=0;
```

%Show image of pixel if show image(ColourFilter);

axis([0,max(PixelSize),0,max(PixelSize)]);

end function out = xyL2XYZ(in)

%_____%

%----------------function out = xyL2XYZ(in)----------------%

%takes in a image in x,y,L co-ordinates (CIE 1931) and returns the %

%tristimulus values %

%--------------------Variables--------------------%

% in - the image in x,y,L co-ordinates %

%--------------------------------------------------%

Y = in(:,:,1)/683;

sumXYZ = Y./(in(:,:,3))

X = in(:,:,2).*sumXYZ

```
Z = (1 - in(:,:,2) -in(:,:,3)).*sumXYZ out(:,:,1)=X;

out(:,:,2)=Y;

out(:,:,3)=Z;
```

The following function is a possible implementation of (30,31) on Figure 3

```
%----------------------SQRI(vx,vy,M)--------------------------------%

%Calculate the square root integral metric

%-----------------------------Variables-----------------------%

%M - is a matrix containing the power spectrum of the distorted

%signal

%vx,vy-are vector or matrix arguments of frequencies that correspond to

%the power spectrum

%---------------------------------Notes-----------------------------%

%See Quality Aspects of Computer based Video Services for details

%_____% v = vector2matrix(vx,vy)

%Calculate ln(v)

lnv(:,:,1) = log(v(:,:,1))+abs(log(min(vx)))

lnv(:,:,2) = log(v(:,:,2))+abs(log(min(vy)))

%Calculate d(ln(v))

[ny,nx,nz]=size(lnv)

dlnv1 = diff(lnv(:,:,1),1,2)

dlnv2 = -diff(lnv(:,:,2),1,1)

dlnv(:,:,1)=dlnv1(1:(ny-1),1:(nx-1))

dlnv(:,:,2)=dlnv2(1:(ny-1),1:(nx-1))

%Calculate the midpoints
```

```
MdInv(:,:,1) = Inv(1:(ny-1),1:(nx-1),1) + dInv(:,:,1)/2

MdInv(:,:,2) = Inv(1:(ny-1),1:(nx-1),2) + dInv(:,:,2)/2

%Calculate Mt clear Mt

Mt(:,:,1) = CSF(v(:,:,1),100,50)

Mt(:,:,2) = CSF(v(:,:,2),100,50)

Mt = sqrt(Mt(:,:,1).*Mt(:,:,2))

Invx = Inv(1,2:nx-1,1)

Invy = Inv(2:ny-1,1,2)

%Calculate the integral

%form matrices

N = interpolate(M,Invx,Invy',vx,vy)

%calculate J

% J = 1/log(2)*sum(sum(sqrt(M(:,:,1).*M(:,:,2) ./ Mt(:,:,1).*Mt(:,:,2))...

% .* MdInv(:,:,1) .* MdInv(:,:,2)))

%Going to have to be a loop dInv=dInv(:,:,1).*dInv(:,:,2)

J = 0 for i=1:length(Invx)

for j=1:length(Invy)

i j

J = J + sqrt(M(i,j)*Mt(i,j))*dInv(i,j)

end end
```

Figure 7:
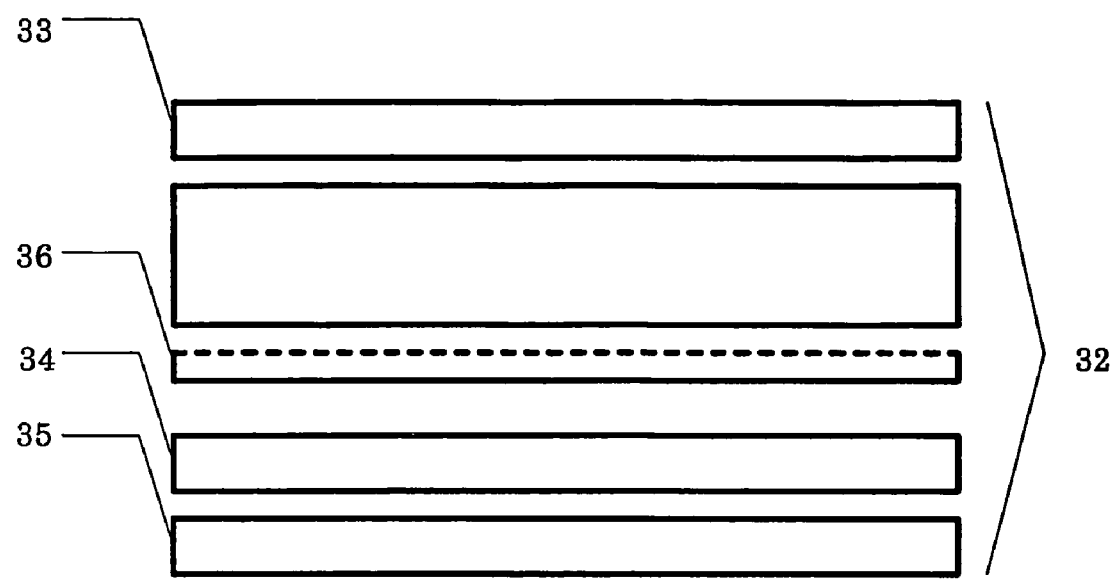
FIG. 7 is a diagram disclosing the hardware embodiment of the present invention

FIG. 7 illustrates yet another preferred embodiment of the present invention implemented with a dual screen display (32) composed of a plurality of transparent imaging screens in the form of a front LCD screen (33), parallel to, but spaced apart from a rear display screen (34) provided with a backlight (35) and spatial filter between the imaging screens (36).

It should be apparent to one skilled in the art that a number of alternative display technologies may be utilised in place of the LCD screens. Furthermore FIG. 7 shows a single screen (33) in front of the rear display (34) for the sake of clarity and convenience any number of additional (at least partially transparent imaging screens (33,34) may be incorporated. Although the rear screen (34) may also be a LCD screen it will be apparent that alternative, non-transparent display technology may be employed.

Such displays provide a three dimensional quality to the scene viewed by an observer as displayed in the applicants co-pending patents PCT number PCT/NZ98/00098 and PCT/NZ99/00021, incorporated by reference herein.

Thus for the sake of clarity and to aid understanding of the present invention, the display (32) and associated display screens (33,34) are shown in simplified schematic form in the drawings; elements not essential to illustrate the present invention are omitted from the drawings to aid comprehension.

In this embodiment the point spread function acting upon the image is controlled by varying the apparent distance, determined by the index of refraction of the interstitial element between the holographic diffuser and the object layer; and the characteristics of the holographic diffuser.

Figure 8:
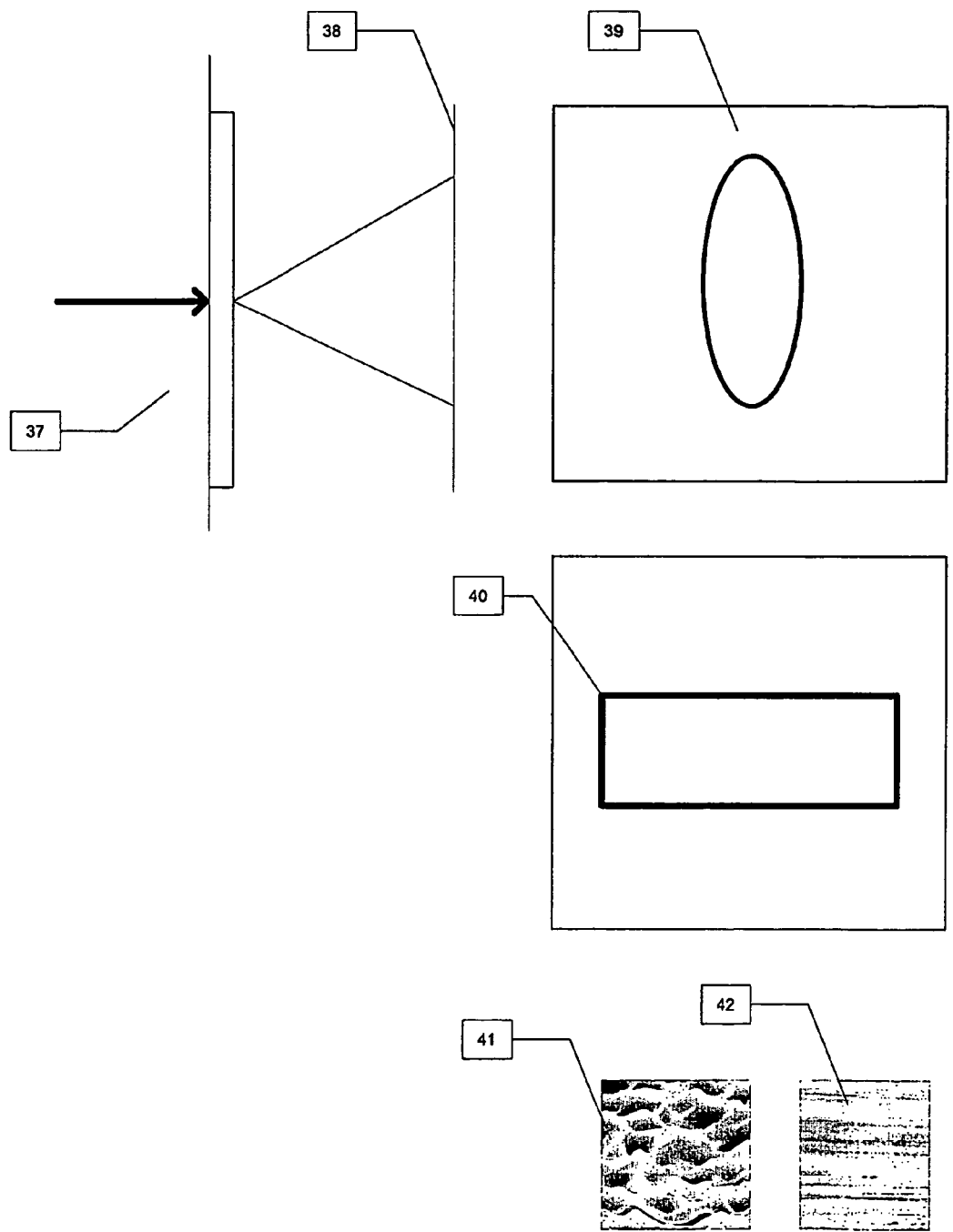
FIG. 8 shows a microscopic image of the holographic diffuser and its effect on an incident laser beam.
Figure 9:
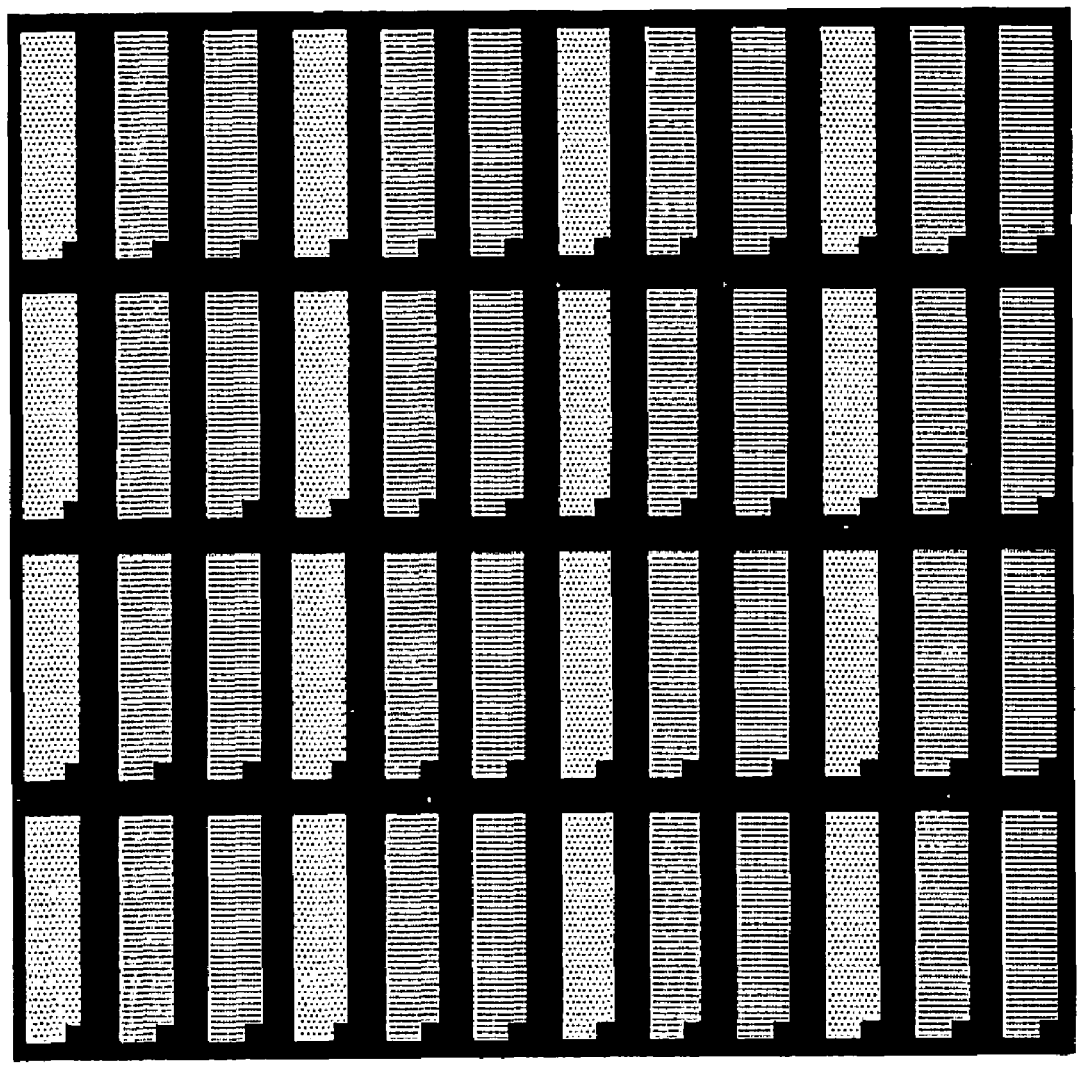
FIG. 9 is a schematic view of a typical stripe pattern used in the art. Red, green and blue sub-pixels are arranged in a matrix where each pixel is formed from a triple of a red sub-pixel, a green sub-pixel and a blue sub-pixel. A sensor dragged across the display in the horizontal direction would detect red, green and blue sub-pixels if not on a horizontal strip of the black matrix. Conversely a sensor dragged in the vertical direction would only see red sub-pixels for example.

To aid understanding the effect of a holographic diffuser acting upon a single ray consider FIG. 8 where a single ray strikes the screen in position (37) producing a 2D dirac delta function distribution. When the screen is moved to position (38) after the diffuser a 2D distribution depending on the scattering profile of the diffuser is formed. The profiles are typically Gaussian along any line in the x-y plane. Preferably the contours (39) are elliptical. More preferably the contours are rectangular (40).

(41) shows a microscopic view of a circularly symmetrical holographic diffuser and (42) shows a microscopic view of a non circularly symmetric holographic diffuser.

Aspects of the present invention have been described by way of example only and it should be appreciated that modifications and additions may be made thereto without departing from the scope thereof.

The invention claimed is:

1. A method of controlling a point spread function of an object, said method comprising:
    determining at least one characteristic of an optical component of a multi-component display, said multi-component display further comprising a first display screen and a second display screen, wherein said first and second display screens overlap as viewed by a viewer;
    determining a distance from an origin of said object to a position based upon said at least one characteristic; and
    positioning said optical component at said position for controlling said point spread function of said object.

2. The method of claim 1, wherein said object comprises a displayed image.

3. The method of claim 1 further comprising:
    adjusting said at least one characteristic of said optical component; and
    determining an undated position for said optical component based upon a new value of said at least one characteristic.

4. The method of claim 1, wherein said origin is associated with said first display screen, and wherein said object is displayed on said first display screen.

5. The method of claim 1, wherein said determining said distance comprises determining said distance based upon a refractive index of a display screen selected from a group consisting of said first display screen and said second display screen.

6. The method of claim 1, wherein said first and second display screens are selected from a group consisting of a liquid crystal display, an organic light emitting diode display, and a transparent organic light emitting diode display.

7. The method of claim 1, wherein said at least one characteristic of said optical component is associated with optical transmission through said optical component.

8. The method of claim 1, wherein said optical component is selected from a group consisting of a spatial filter, a prismatic filter, a spatial diffuser, and a holographic diffuser.

9. The method of claim 1, wherein said positioning said optical component at said position further comprises positioning said optical component at said position for altering an optical characteristic associated with said object, and wherein said optical characteristic is selected from a group consisting of Moiré interference and blurriness.

10. A method of controlling a point spread function of an object, said method comprising:
    determining at least one characteristic of an optical component of a projection system, said projection system operable to project an image onto an image layer;
    determining a distance from an origin of said object to a first position based upon said at least one characteristic; and
    positioning said optical component at said first position for controlling said point spread function of said object and further wherein said position reduces Moiré interference without over-blurring said image.

11. The method of claim 10, wherein said object comprises a projected object generated by said projection system.

12. The method of claim 10, further comprising:
    adjusting said at least one characteristic of said optical component; and
    re-positioning said optical component at a second position based upon a second value of said at least one characteristic.

13. The method of claim 10, wherein said at least one characteristic of said optical component is associated with optical transmission through said optical component.

14. The method of claim 10, wherein said optical component is selected from a group consisting of a spatial filter, a prismatic filter, a spatial diffuser, and a holographic diffuser.

15. A method of controlling a point spread function of an object, said method comprising:
    determining at least one characteristic of an optical component of a projection system, said projection system operable to project an image onto an image layer;
    determining a distance from an origin of said object to a first position based upon said at least one characteristic;
    positioning said optical component at said first position for controlling said point spread function of said object;
    adjusting said at least one characteristic of said optical component; and
    re-positioning said optical component at a second position based upon a second value of said at least one characteristic for further controlling said point spread function of said object.

16. The method of claim 15, wherein said object comprises a projected object generated by said projection system.

17. The method of claim 15, wherein said at least one characteristic of said optical component is associated with optical transmission through said optical component.

18. The method of claim 15, wherein said optical component is selected from a group consisting of a spatial filter, a prismatic filter, a spatial diffuser, and a holographic diffuser.

19. The method of claim 15, wherein said positioning said optical component at said position further comprises positioning said optical component at said first position for altering an optical characteristic associated with said object, and wherein said optical characteristic is selected from a group consisting of Moiré interference and blurriness of said object.

* * * * *